(12) United States Patent
Weber et al.

(10) Patent No.: US 8,443,422 B2
(45) Date of Patent: May 14, 2013

(54) METHODS AND APPARATUS FOR A CONFIGURABLE PROTECTION ARCHITECTURE FOR ON-CHIP SYSTEMS

(75) Inventors: Wolf-Dietrich Weber, San Jose, CA (US); Drew A Wingard, Palo Alto, CA (US); Stephen W Hamilton, Pembroke Pines, FL (US); Frank Seigneret, Saint-Jeannet (FR)

(73) Assignee: Sonics, Inc., Milpitas, CA (US)

( * ) Notice: Subject to any disclaimer, the term of this patent is extended or adjusted under 35 U.S.C. 154(b) by 51 days.

(21) Appl. No.: 12/874,123

(22) Filed: Sep. 1, 2010
(Under 37 CFR 1.47)

(65) Prior Publication Data
US 2011/0067114 A1    Mar. 17, 2011

Related U.S. Application Data

(63) Continuation-in-part of application No. 10/288,973, filed on Nov. 5, 2002, now Pat. No. 7,266,786.

(51) Int. Cl.
*G06F 7/04* (2006.01)
*G06F 15/16* (2006.01)
*G06F 17/30* (2006.01)
*H04L 29/06* (2006.01)

(52) U.S. Cl.
USPC ...................... 726/4; 726/2; 726/21

(58) Field of Classification Search .................. 726/2–6, 726/11–13, 26–30
See application file for complete search history.

(56) References Cited

U.S. PATENT DOCUMENTS

| | | | |
|---|---|---|---|
| 3,747,946 A | 7/1973 | Edens | |
| 4,298,208 A | 11/1981 | Benjamin et al. | |
| 4,665,395 A | 5/1987 | Van Ness | |
| 4,814,982 A | 3/1989 | Weir | |
| 5,657,475 A * | 8/1997 | Gillespie et al. | 711/163 |
| 5,774,647 A | 6/1998 | Raynham et al. | |
| 5,948,089 A | 9/1999 | Wingard et al. | |
| 5,987,557 A * | 11/1999 | Ebrahim | 710/200 |
| 5,991,895 A | 11/1999 | Laudon et al. | |
| 5,995,736 A | 11/1999 | Aleksic et al. | |
| 6,006,022 A | 12/1999 | Rhim et al. | |
| 6,023,565 A | 2/2000 | Lawman et al. | |
| 6,072,944 A | 6/2000 | Robinson | |

(Continued)

FOREIGN PATENT DOCUMENTS

| | | |
|---|---|---|
| GB | 2325061 | 11/1998 |
| WO | WO 2004/044681 | 5/2004 |

OTHER PUBLICATIONS

Cross Reference to Related Applications Under 37 C.F.R. 1.78, 2 pages.

(Continued)

*Primary Examiner* — Eleni Shiferaw
*Assistant Examiner* — Jing Sims
(74) *Attorney, Agent, or Firm* — Rutan & Tucker, LLP

(57) ABSTRACT

Various methods and apparatuses of protection mechanism are described. A target intellectual property block may field and service requests from an initiator intellectual property block in a system-on-chip network. The target intellectual property block has an associated protection mechanism with logic configured to restrict access for the requests to the target intellectual property block. The request's access is restricted based on access permissions associated with a region within the target intellectual property block and attributes of the request trying to access that region.

20 Claims, 14 Drawing Sheets

U.S. PATENT DOCUMENTS

| | | | |
|---|---|---|---|
| 6,101,590 A | 8/2000 | Hansen | |
| 6,182,183 B1 | 1/2001 | Wingard et al. | |
| 6,209,123 B1 | 3/2001 | Maziasz et al. | |
| 6,233,702 B1 | 5/2001 | Bunton et al. | |
| 6,330,225 B1 | 12/2001 | Weber et al. | |
| 6,367,058 B1 | 4/2002 | Heile | |
| 6,484,227 B1 * | 11/2002 | Mergard et al. | 711/1 |
| 6,505,260 B2 | 1/2003 | Chin et al. | |
| 6,516,456 B1 | 2/2003 | Garnett et al. | |
| 6,519,690 B1 * | 2/2003 | Quimby | 711/202 |
| 6,543,043 B1 | 4/2003 | Wang et al. | |
| 6,578,117 B2 | 6/2003 | Weber | |
| 6,651,171 B1 | 11/2003 | England et al. | |
| 6,662,251 B2 | 12/2003 | Brock et al. | |
| 6,715,085 B2 * | 3/2004 | Foster et al. | 726/27 |
| 6,725,313 B1 | 4/2004 | Wingard et al. | |
| 6,775,750 B2 | 8/2004 | Krueger | |
| 6,785,753 B2 | 8/2004 | Weber et al. | |
| 6,854,039 B1 | 2/2005 | Strongin et al. | |
| 6,976,106 B2 | 12/2005 | Tomlinson et al. | |
| 7,062,695 B2 | 6/2006 | Tester | |
| 7,107,374 B1 * | 9/2006 | Stadler | 710/107 |
| 7,149,829 B2 | 12/2006 | Weber et al. | |
| 7,165,094 B2 | 1/2007 | Weber et al. | |
| 7,266,786 B2 | 9/2007 | Chou et al. | |
| 7,793,345 B2 | 9/2010 | Weber et al. | |
| 2002/0049582 A1 * | 4/2002 | Baumgartner et al. | 704/201 |
| 2003/0200520 A1 | 10/2003 | Huggins et al. | |
| 2004/0177186 A1 | 9/2004 | Wingard et al. | |
| 2004/0210696 A1 | 10/2004 | Meyer et al. | |
| 2006/0123010 A1 | 6/2006 | Landry et al. | |
| 2007/0162268 A1 | 7/2007 | Kota et al. | |
| 2008/0005713 A1 | 1/2008 | Singh et al. | |
| 2008/0133489 A1 | 6/2008 | Armstead et al. | |
| 2010/0057400 A1 | 3/2010 | Chou et al. | |

OTHER PUBLICATIONS

Supplementary European Search Report for Application No. 03781736.8, dated Nov. 21, 2008, 4 pages.

International Search Report for PCT/US2003/035022, mailed Aug. 20, 2004, 2 pages.

International Preliminary Examination Report for PCT/US2003/035022, mailed Dec. 7, 2004, 5 pages.

Wingard, D., (Sonics Inc.), Sonics SOC Integration Architecture, P1500 Presentation, Jan. 28, 1999, pp. 1-25.

Weber, Wolf-Dietrich, (Sonics, Inc) "Efficient Shared DRAM Subsystems for SOC's", Systems on IC's, www.sonicsinc.com Copyright 2001, pp. 1-6.

OCP International Partnership, "Open Core Protocol Specification", Release 1.0, OCP-IP Confidential, Document Revision, 1.1.1, Copyright 2001, 210 pages.

Kamas, Alan, The Systemc OCP Models, An Overview of the SystemC Models for the Open Core Protocol, 2004, pp. 1-30.

Haverinen, Anssi, et al., White Paper for SystemC (TM) based SoC Communication Modeling for the OCP (T) Protocol, V1.0, Oct. 14, 2002, pp. 1-39.c.

Non-Final Office Action for U.S. Appl. No. 10/288,973 mailed Apr. 2, 2004, 4 pages.

Non-Final Office Action for U.S. Appl. No. 10/288,973 mailed Jul. 29, 2004, 6 pages.

Final Office Action for U.S. Appl. No. 10/288,973 mailed Jun. 2, 2005, 7 pages.

Non-Final Office Action for U.S. Appl. No. 10/288,973 mailed Jan. 13, 2006, 4 pages.

Non-Final Office Action for U.S. Appl. No. 10/288,973 mailed May 22, 2006, 7 pages.

Non-Final Office Action for U.S. Appl. No. 10/288,973 mailed Nov. 13, 2006, 4 pages.

Non-Final Office Action for U.S. Appl. No. 11/237,038 mailed Dec. 9, 2008, 30 pages.

Final Office Action for U.S. Appl. No. 11/237,038 mailed Jun. 8, 2009, 27 pages.

Advisory Action for U.S. Appl. No. 11/237,038 mailed Sep. 22, 2009, 3 pages.

Office Action for European Patent Application No. 03781736.8 mailed Apr. 24, 2009, 4 pages.

Office Action for Korean Patent Application No. 2005-7007810 mailed Jun. 12, 2009, 5 pages.

Office Action for Korean Patent Application No. 2005-7007810 mailed Dec. 31, 2009, 5 pages.

Office Action for Japanese Patent Application No. 2004-551691 mailed May 11, 2010, 7 pages.

Final Office Action for Japanese Patent Application No. 2004-551691 mailed Jan. 18, 2011, 9 pages.

AMBA Specification Rev. 2.0, released on May 13, 1999, www.ARM.com, 231 pages.

* cited by examiner (a)      FIGURE 11      (b)

RU= REGISTER UNIT

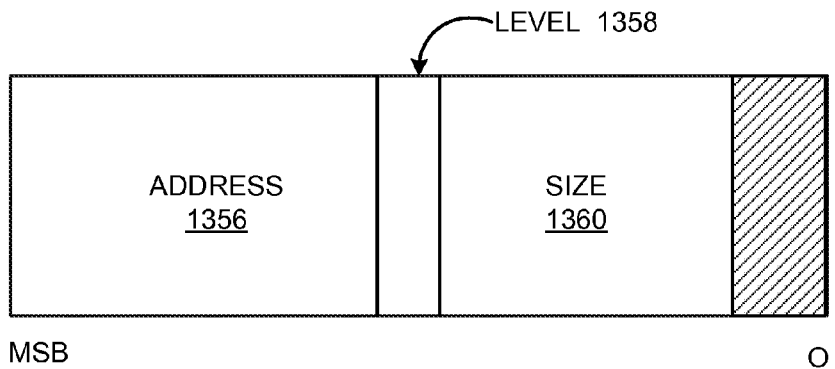
FIGURE 13
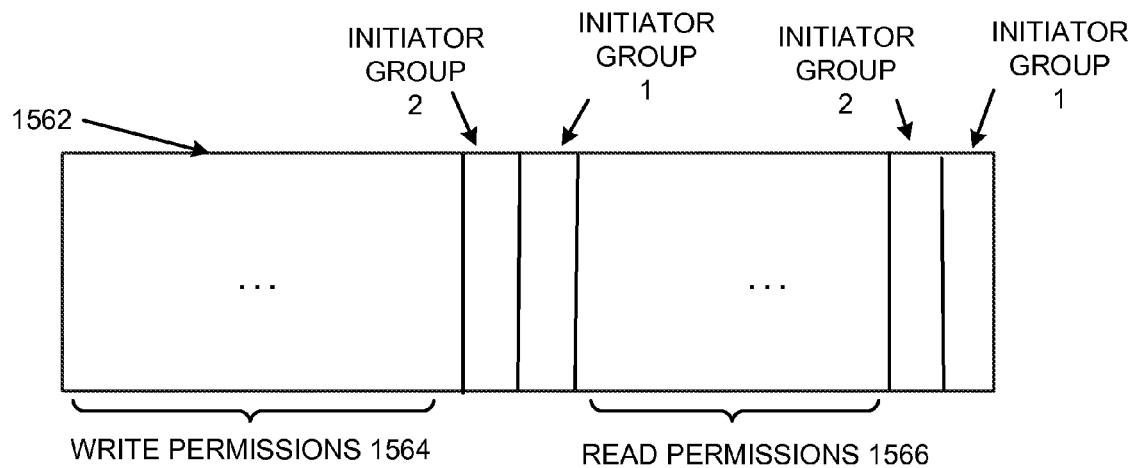
FIGURE 14
FIGURE 15

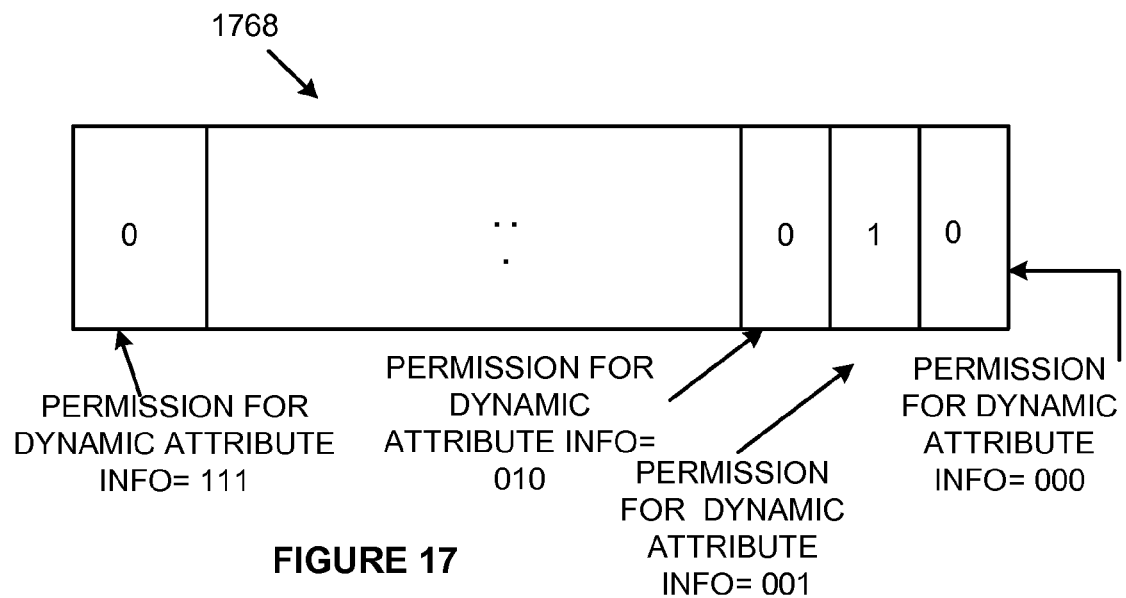
FIGURE 16
FIGURE 17
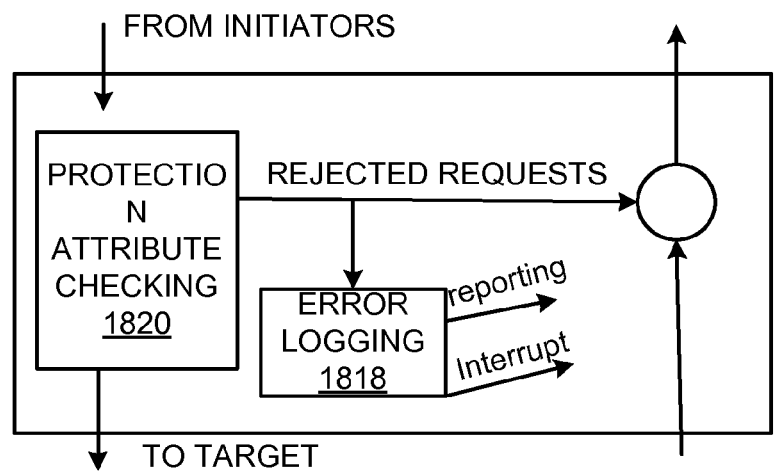
FIGURE 18

US 8,443,422 B2

METHODS AND APPARATUS FOR A CONFIGURABLE PROTECTION ARCHITECTURE FOR ON-CHIP SYSTEMS

RELATED APPLICATION

This application is a continuation-in-part application and claims the benefit of U.S. patent application Ser. No. 10/288,973, entitled "METHOD AND APPARATUS FOR CONFIGURABLE ADDRESS MAPPING AND PROTECTION ARCHITECTURE AND HARDWARE FOR ON-CHIP SYSTEMS," filed on Nov. 5, 2002 now U.S. Pat. No. 7,266,786.

FIELD OF THE INVENTION

The present invention pertains to on-chip systems. More particularly, the present invention relates to a method and apparatus for a configurable address mapping and protection architecture and hardware for on-chip systems.

BACKGROUND OF THE INVENTION

The operational model for most computer and/or on-chip systems involves the sending of requests from one or more processing units to one or more service modules in the system. Upon receiving a request (i.e., an instruction) from a processing unit, a service module completes the task as requested. Then, there may be responses to be returned from the service module back to the processing unit. It is also very common to have a component in the system to act as both a processing unit and a service module.

Many different ways may be used to deliver requests and responses between processing units and servicing modules. One of the most frequently used methods, for delivering the requests, is by addressing (plus, protection checking). For instance, a request is tagged with a "destination address" and a "source protection identification (ID)". The destination address tells where the service module(s) is (are) located, and/or how to deliver the request to the service module(s). The source protection ID identifies the processing unit and is used to determine whether the service module(s) should execute the request, or whether the request can be delivered to the service module(s), thus providing access to the service module selectively depending on source identity.

Usually, the number of transistors (often referred to as "gates") and the resulting gate size (and thus area) of the hardware module (on, for example, an integrated circuit) devoted to address decoding and protection ID checking are comparatively large. Additional circuitry, which consumes more power, may also be needed in order to make this decoding and checking hardware dynamic (i.e., configurable) during operation. For a wireless device, especially, where the demand for a smaller chip die size and a lower power consumption is high, a large and power-consuming address decoding and protection-checking module is unacceptable. This presents problems.

BRIEF DESCRIPTION OF THE DRAWINGS

The invention is illustrated by way of example and not limitation in the figures of the accompanying drawings, in which like references indicate similar elements and in which:

FIGS. 11a-11c illustrate block diagrams of an embodiment of the address space of a target intellectual property block with several overlapping protection regions;

FIG. 13 illustrates a block diagram of an embodiment of a register defining the base starting address of the protection region, the size of the protection region, and a priority level of the protection region;

FIG. 14 illustrates a block diagram of an embodiment of an initiator group matching logic with programmable registers to store initiator IDs and the initiator groups;

FIG. 15 illustrates a block diagram of an embodiment of an register controlling read access and write access to a target intellectual property block;

FIG. 16 illustrates a block diagram of an embodiment of dynamic attribute checking logic to look up in a table permissions that are associated with dynamically changeable attributes of a request by a bit vector pattern;

FIG. 17 illustrates a block diagram of an embodiment of a register controlling dynamically changeable attributes needed for a request to access a target intellectual property block; and FIG. 18 a block diagram of an embodiment of error logging logic that records details of a failed request, and that reports the failed access attempt to either or both the initiator intellectual property block that initiated the failed request or to another component.

DETAILED DESCRIPTION

A method and apparatus for a configurable address mapping and protection architecture and hardware for on-chip systems are described.

Figure 1:
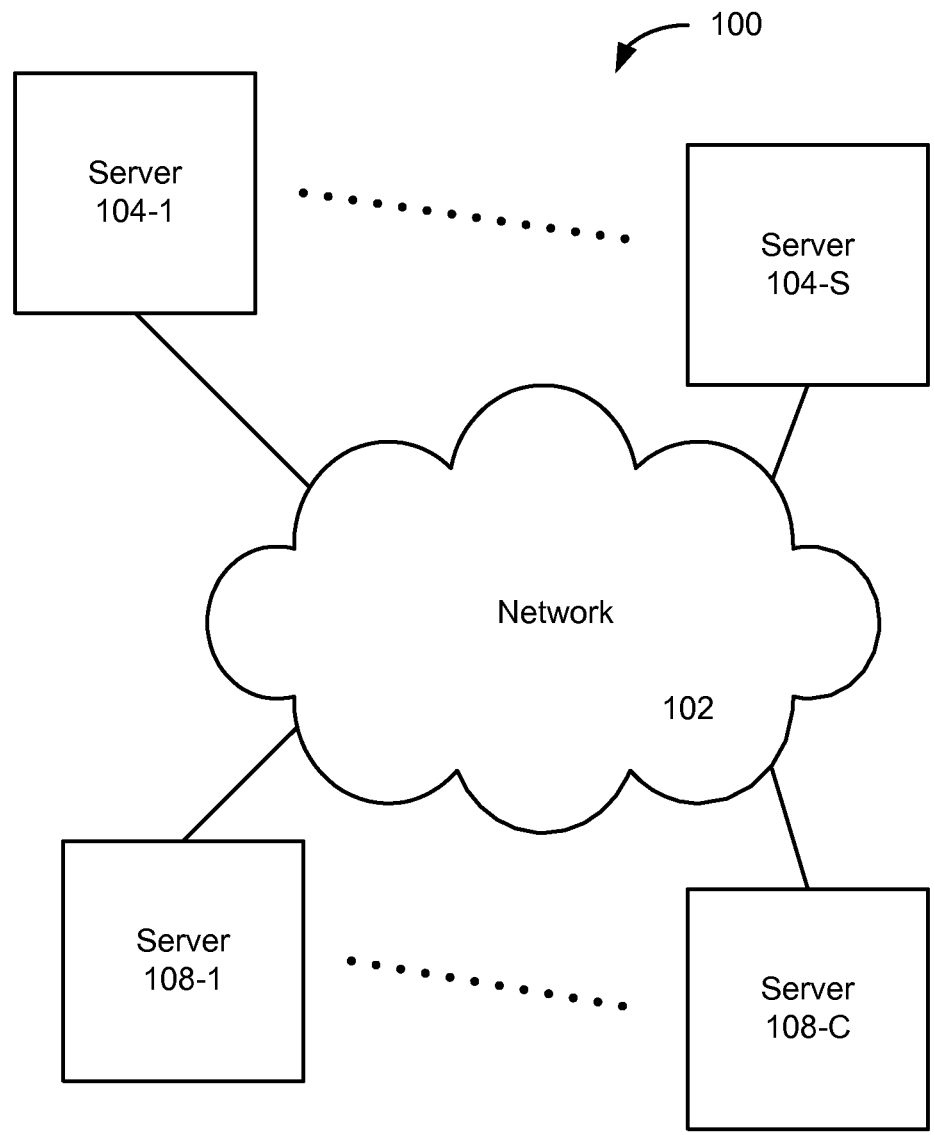
FIG. 1 illustrates a network environment in which the method and apparatus of the present invention may be implemented.

FIG. 1 illustrates a network environment 100 in which the techniques described may be applied. The network environment 100 has a network 102 that connects S servers 104-1 through 104-S, and C clients 108-1 through 108-C. More details are described below.

Figure 2:
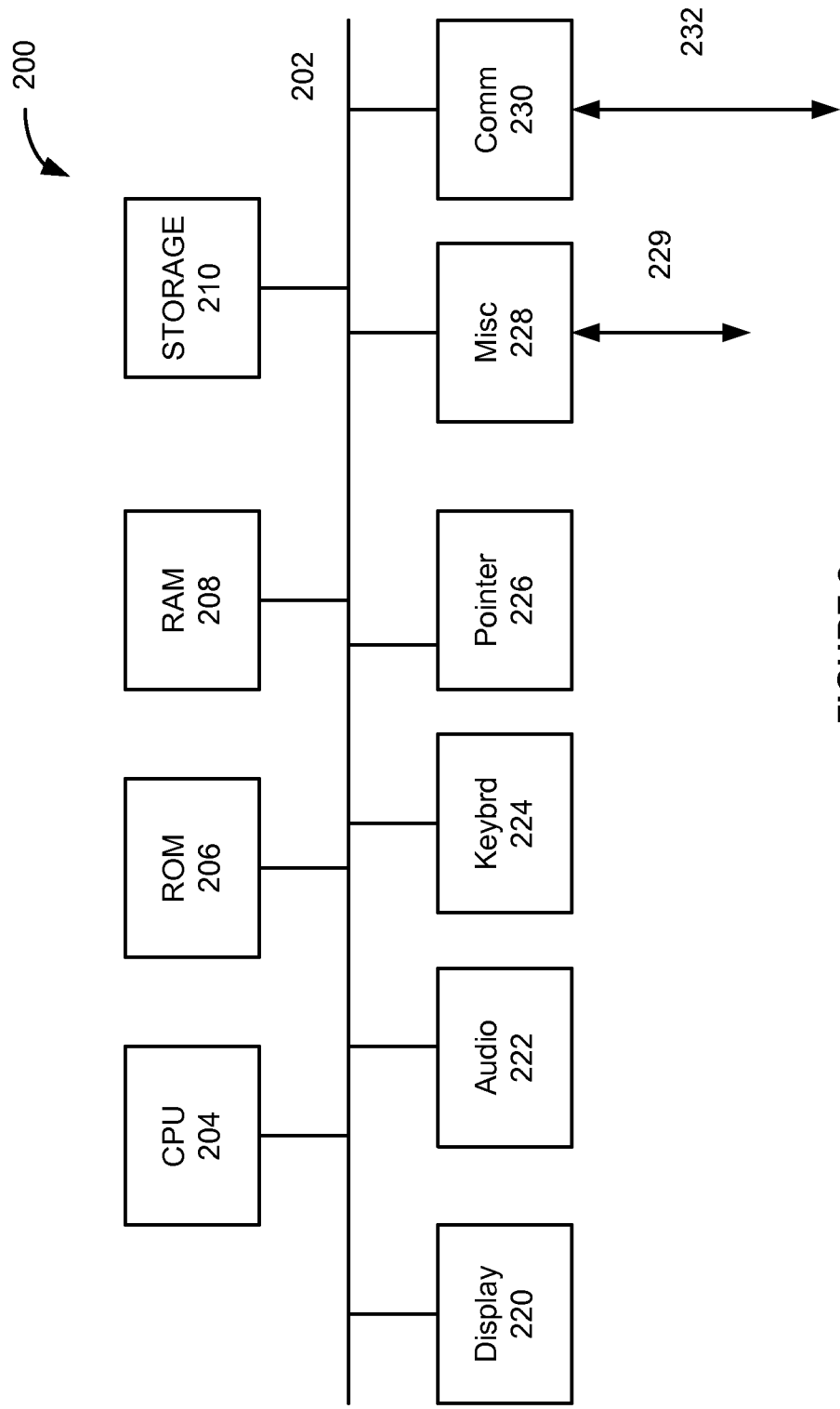
FIG. 2 is a block diagram of a computer system.

FIG. 2 illustrates a computer system 200 in block diagram form, which may be representative of any of the clients and/or servers shown in FIG. 1. More details are described below.

The term IP as used in this document denotes Intellectual Property. The term IP, may be used by itself, or may be used with other terms such as core, to denote a design having a functionality. For example, an IP core or IP for short, may consist of circuitry, buses, communication links, a microprocessor, etc. Additionally, IP may be implemented in a variety of ways, and may be fabricated on an integrated circuit, etc. The term flooding is used to denote a communication in which an incoming packet is duplicated and sent out on every outgoing pathway throughout most of a chip, system, etc.

In this disclosure, a method and apparatus for a configurable address mapping and protection architecture and hardware for on-chip systems are described. In one embodiment of the invention, circuitry for providing the necessary address mapping and protection functionality is provided in hardware. In another embodiment the invention allows a product designer to configure the address mapping and protection module at design time, such that, only the minimum specified mapping and protection is implemented into the hardware. Thus, the final gate size and power consumption of the address mapping and protection hardware module is determined by the specification of the product. Moreover, the address width and data word width for each of the service modules may also be considered and used to minimize the number of signal wires to/from the service modules. This may result in hardware that is not over designed and may more easily meet the gate count and power consumption requirements of a product.

The disclosed invention "configurable address mapping and protection architecture and hardware for on-chip systems" may provide:
1. A centralized, configurable address mapping and protection architecture for an on-chip system.
2. A set of configuration parameters that may lead to overall gate size reduction, power consumption reduction, and/or the elimination of unnecessary signal wires for a final address mapping and protection hardware module.
3. The ability for a designer to configure the address mapping and protection hardware module at design time using a specification language and achieve the goal of producing a minimized hardware implementation.

Figure 4:
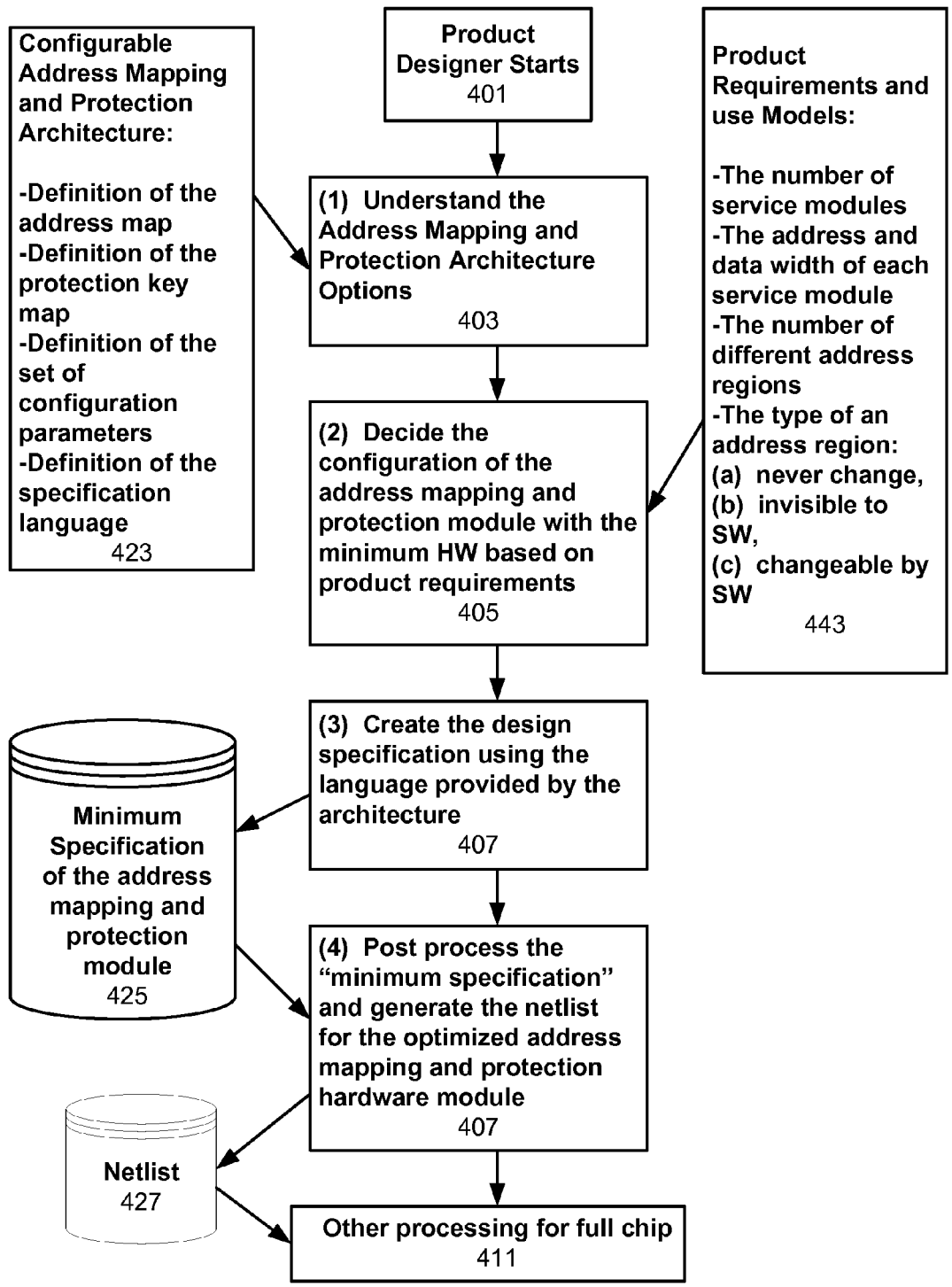
FIG. 4 illustrates one embodiment of the invention showing in a flowchart form the process in generating optimized address mapping and protection hardware.

FIG. 4 shows the processing flow that can be used in generating optimized address mapping and protection hardware. First, a product designer must understand the configurable architecture (403). The architecture (423) includes the definition of the address mapping scheme, the definition of the protection scheme, the definition of the set of configuration parameters, and the definition of the specification language. Then, the designer can design the address mapping and protection module with minimum hardware based upon the product requirements (405). Based on the product requirements and user models, the designer should be able to decide, for instance, the number of service modules in the system, the number of address regions for a service module, and how the information of an address region is going to be used (443).

Next the designer needs to specify the address mapping and protection hardware module using the provided specification language (407 and 425). At the end (409), a post-processing tool, which takes the design specification as input, is used and generates an optimized hardware gate-level Netlist (427) for the address mapping and protection hardware.

Figure 3:
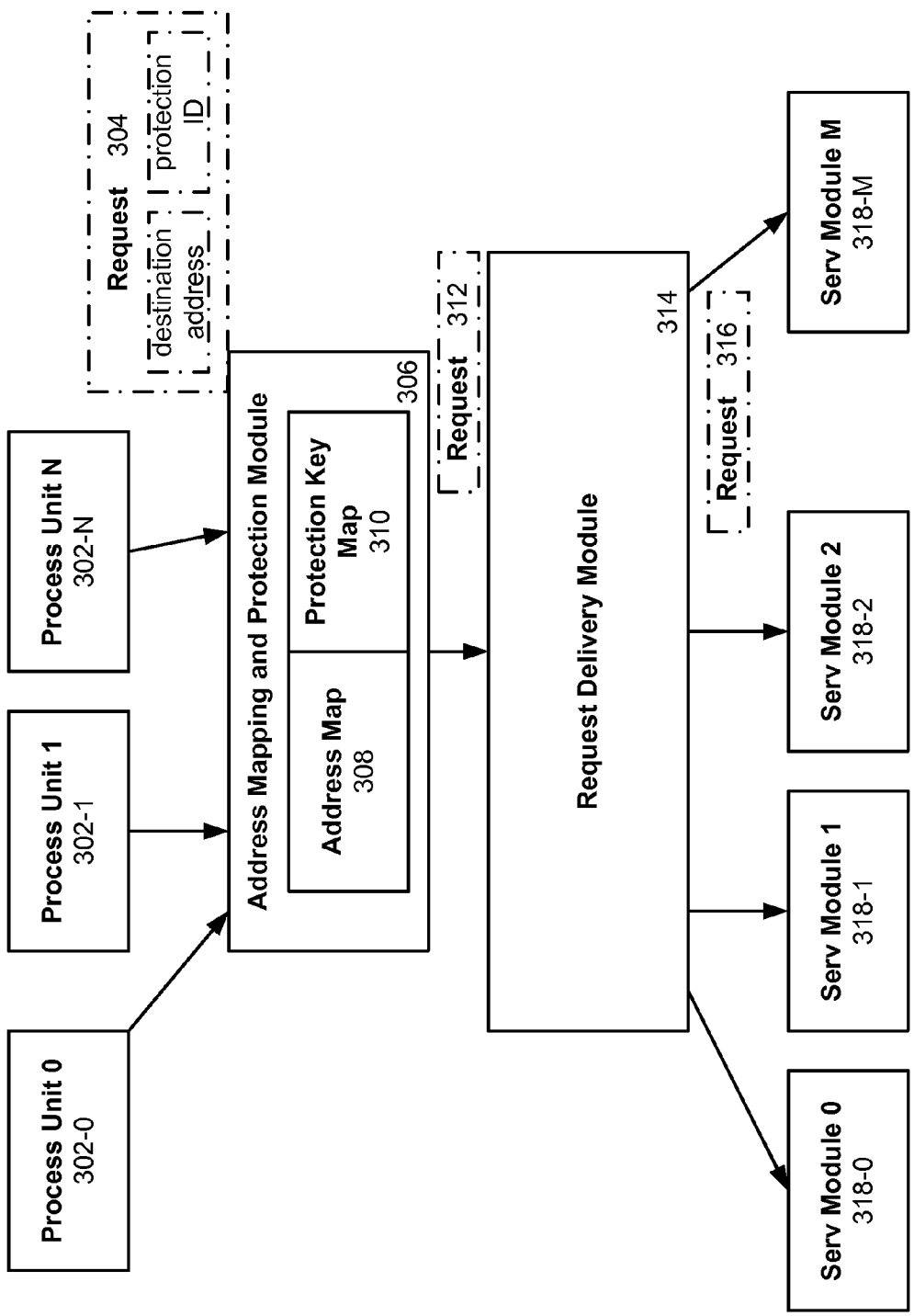
FIG. 3 illustrates one embodiment of the invention showing in a block diagram form an on-chip system with N processing units, M service modules, an address mapping and protection module, and a request-delivery module.

FIG. 3 shows a block diagram of one embodiment of the invention having an on-chip system with N processing units at the top (302-0, 302-1, through 302-N), and M service modules at the bottom (318-0, 318-1, through 318-M). In the middle of the system is an address mapping and protection module 306, showing the address mapping 308 and protection key map 310 followed by a request-delivery module 314. Note that FIG. 3 only shows the request delivery side of the system (i.e., the request side and does not show the return side). In one embodiment of the invention, the use model of the system is the following:

A request is sent from a processing unit (such as 320-N) to the address mapping and protection module (306).

In the address mapping and protection module 306, the "destination address" and "source protection ID" are extracted out of the request (such as that illustrated at 304). The address is decoded and compared against the address map (308) to find out where the service module is and how to deliver the request to the module. The given protection ID is checked against the protection key map (310) to determine whether the request should be delivered to the service module because the protection allows it. Note that other possible fields inside a request, not shown in FIG. 3, are "request type field", "data field", "data type field" (e.g., to indicate that it is a burst data stream), and "user provided request information" (e.g., user can use this field to provide a proprietary, sub request type).

Next, the request (such as that illustrated at 312 and 316) is sent to the service module (such as 318-2) by the request-delivery module (314).

One embodiment of the invention having a configurable address mapping and protection architecture using segmentation and address regions for the on-chip system mentioned above is described here. Conceptually, the address space for the entire on-chip system may be divided into R address regions. Each service module in the system may have multiple address regions. In order to reduce the complexity of matching to 1 of the R address regions, multiple address regions may be grouped into one address segment. There may be up to S segments in the system. To send a request to a specific service module, a processing unit needs to tag the request with an address that is within an address region of the module. The information about an address region is kept in a region register stored in the address map hardware. Information about an address segment is kept in a segment register, which is also stored in the address map hardware.

There may be up to K different protection keys in the system; each protection key is kept in one protection key register, which resides in the protection key map hardware. Each address region is associated with at least one protection key, and each processing unit is assigned with one or more protection ID. When a request is sent from a processing unit, the request is tagged with a protection ID (such as 515 shown in FIG. 5) of the processing unit. After the request's destination address is decoded and a service module's address region is identified, the protection ID is checked against those protection keys associated with that address region to see whether it is safe to forward the request to the service module.

Figure 5:
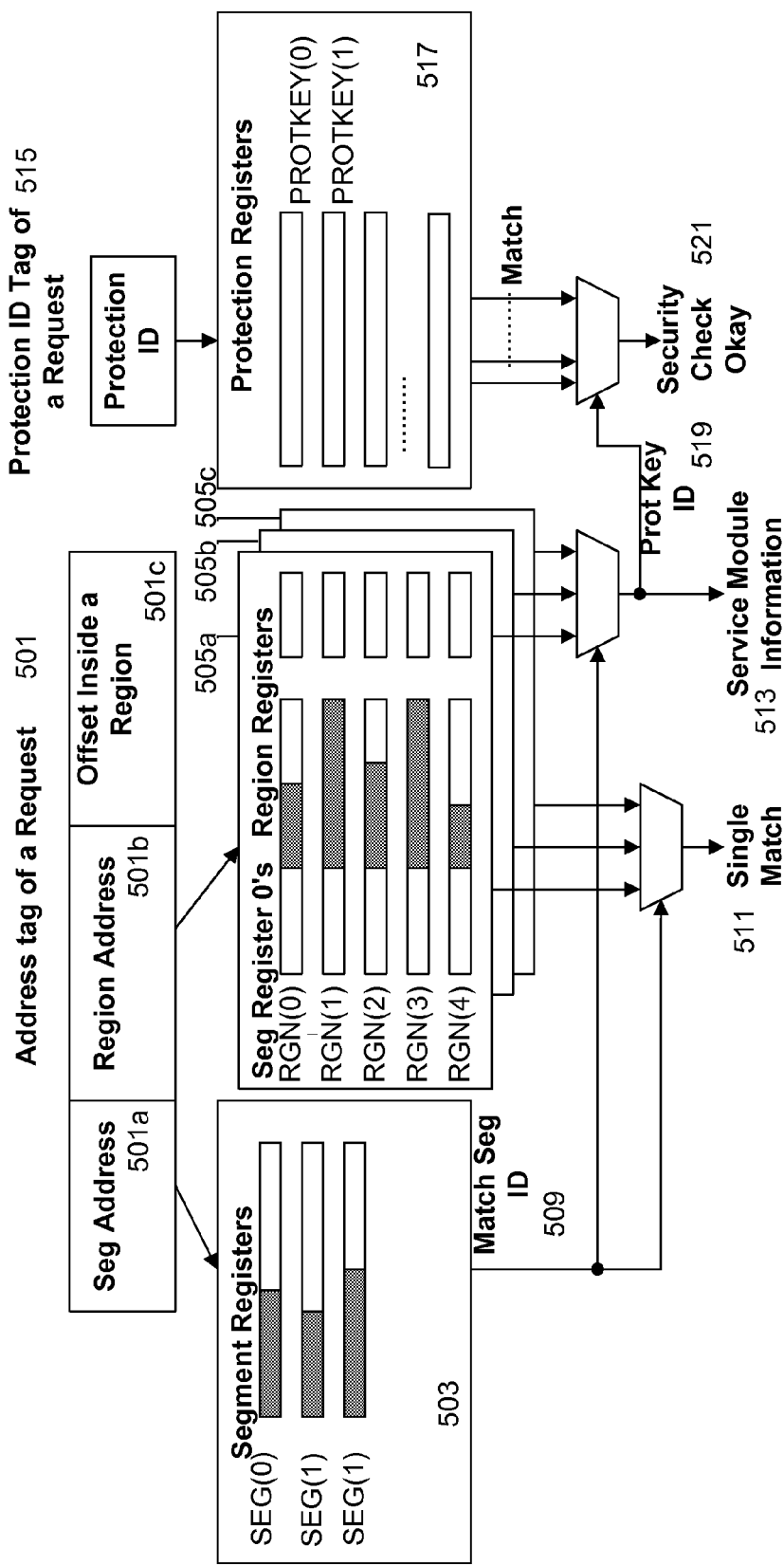
FIG. 5 illustrates one embodiment of the invention showing in block diagram form a hardware implementation for the configurable address mapping and protection architecture.

FIG. 5 shows one embodiment of the invention having a hardware implementation of the address mapping and protection architecture mentioned above. In FIG. 5, a request is shown with its destination address tag and protection ID tag (such as illustrated in FIG. 3 at 304). The destination address contains three parts, a segment (base) address part 501a, a region (base) address part 501b, and the offset within the region 501c. The address mapping hardware contains the S segment registers (503) and the R region registers (505a, b, and c, for example; and there can be more region pages as shown in FIG. 3). Each address segment may contain multiple address regions—this is illustrated by having one page of region registers associated with each segment register (pages 505a, 505b, and 505c are associated with, for example, segment register 0, segment register 1, and segment register 2, respectively. FIG. 5 also shows that the address segment 0 has five region registers (505a).

Moreover, the segment address of a request is used to match one of the segment registers (509), and the region address is used to match one or more of the region registers kept in the address map. Combining the two matching signals, in a normal case, one single match happens (511). Note that a duplicate match and a failed match may be detected, if desirable, as errors.

If a single match occurs, the protection key register number associated with the region is returned (519); and the routing information for the targeting service module is also returned (513). The protection key register number (519) is used to filter out unrelated matches coming out of the protection key map module (517). A positive security okay signal (521) indicates that the request can be delivered to the servicing module.

Table 1 shows a summary of the combinations and the results of a normal matching case (i.e., a single address match is identified and security check is also okay), and error cases. When a single match is identified, Information (saved in the matched region register) about the destination service module is forwarded to the downstream modules. For instance, The protection key ID is forwarded to the "Security Check Okay" circuit in order to complete the security check.

The destination service module's data word width and physical target ID (the physical target ID contains the physical location information of the service module) are forwarded to the request-delivery module.

TABLE 1

| Matching and checking on fields | Normal Case | Error Case 1 | Error Case 2 | Error Case 3 |
|---|---|---|---|---|
| Request's segment (base) address | Single match | Single match | Single match | Double match |
| Request's region (base) address | Single match on the region register page of the matched segment | Single match on the region register page of the matched segment | Double match on the region register page of the matched segment | Don't care |
| Request's protection ID | Okay | Not okay | Don't care | Don't care |
| Results | Information about the destination service module is generated and forwarded to the request-delivery module | Protection violation | Error found in the region address map | Error found in the segment address map |

A set of configuration parameters and registers (plus register fields in each type of register) are also identified for the architecture mentioned above such that a designer can adjust them in order to build the address mapping and protection module with minimum hardware. The final goal is to reduce the hardware module's gate size, power consumption, and signal wires. The following lists the configuration parameters, their definition, and how they can affect hardware:

DataWidth: This parameter represents the data word size of a request. Different data word sizes can be allowed for requests coming from different processing units. However, only a single data width parameter is used here; thus, requests coming from the processing units have the same data word size. Setting this parameter to only the needed data word size can save gates and wires in the hardware module.

AddrWidth: This parameter represents the address tag width for the on-chip system; i.e., the dimension of the address mapping and protection module. Setting this parameter to only the needed address width can save a great number of gates and wires in the hardware module.

NumSegments: This parameter indicates how many segment registers can exist in the system and is used to removed un-needed segment registers.

For each segment register:
  SegmentSize register field: This field tells the size of a segment; it can be used to reduce the number of bits for a segment register.
  SegmentBase register field: This field indicates the segment base address of an address segment.

NumRegions: This parameter indicates how many region registers can exist in the system and is used to remove un-needed region registers.

For each region register:
  RegionSize register field: This field tells the size of an address region; it can be used to reduce the number of bits for a region register.
  RegionBase register field: This field indicates the region base address of an address region.
  RegionProtectionKeyRegisterNum (RPKRN) register field: This field tells which protection key register is to be used by the security checking logic when a single match occurs on this address region. Multiple register fields of this type can exist, however, only one is used here.
  RegionDataWidth register field: This field tells the data word width of the service module that links to an address region. It can be used to trim data bus wires, if possible, connecting to the service module. It can also be used to indicate whether data packing or unpacking is needed; packing or unpacking may be needed when the data word size of a request's source processing unit is different from the data word size of the request's destination service module.
  RegionPhysicalTargetID (RPTID) register field: This field describes the physical linkage between an address region and a service module. This physical linkage can be, for example: (1) hardware routing information to be passed on to the request-delivery module in order to deliver a request to the service module; or (2) a hardware signal bit position such that, when the request-delivery module asserts the signal, a request is sent to the service module.
  RegionAddressSpace (RAS) register field: This field allows an address region of a service module to be further partitioned.
  RegionEnable register field: This field indicates whether or not this region register is used for the current design or to indicate whether the region is currently available.

NumProtectionKeys: This parameter indicates how many protection key registers can exist in the system and is used to remove un-needed protection key registers. In addition, it can also save bits in each of the region registers, where a protection key number is stored.

For each protection key register:
ProtectionKeyBitVector register field: This bit vector tells which protection IDs are allowed to access the service modules that are linked by region registers pointing to this protection key register. A bit 1 in position N indicates that a request tagged with protection ID of N is okay to access the request's destination service module.

NumProtectionIDs: This parameter indicates how many different protection IDs can exist in the system and is used to removed un-needed protection key bits in the ProtectionKeyBitVector register field.

Endianess: This parameter tells whether the big endianess or little endianess is applied in the architecture; it determines the address byte location and the data byte sequence coming out of data packing/unpacking.

Moreover, the register fields of each of the registers can also be specified to be one of the following three usage types so that a minimum logic design can be applied to construct the hardware to save area and power:

Non-Accessible (NA) Register Field: A register field is hardwired to a power-on value and cannot be read, nor written.

Read-Only (RO) Register Field: A register field is hardwired to a power-on value and needs to be software visible (read-only) during operation. In this case, extra gates are needed in order to allow the software read access of the register field.

Read-Write (RW) Register Field: A register field can be read and written by software dynamically. For this type of register field, extra circuitry (for example, in the form of flip-flops and gates) is needed in order to allow software changes.

Additionally, each register field can also be specified as an "exporting constant" (EC) register field such that the Netlist portion of the register field is exported to the top-level of the final Netlist. It makes the power-on value of a register field more easily to be manually modified, as needed by a product, late during the full chip generation process. For instance, the ProtectionKeyBitVector register field of each of the protection key registers can be declared as "exporting constant" field; therefore, it allows a final protection key map to be put into the chip late in the product generation process.

Figure 6:
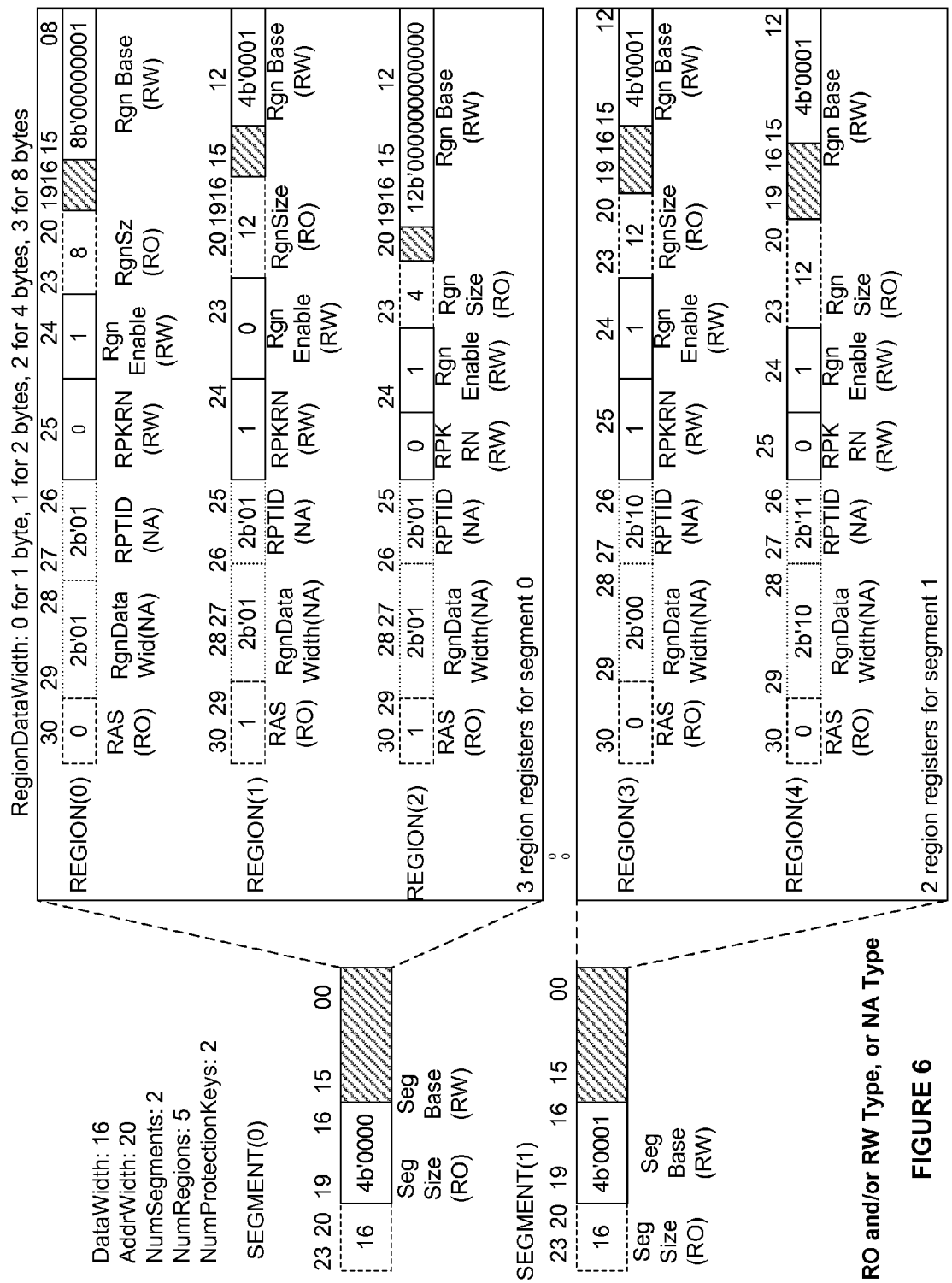
FIG. 6 illustrates one embodiment of the invention showing in table form, a definition of some possible read-only, read-write, or not-accessible configuration parameters.
Figure 7:
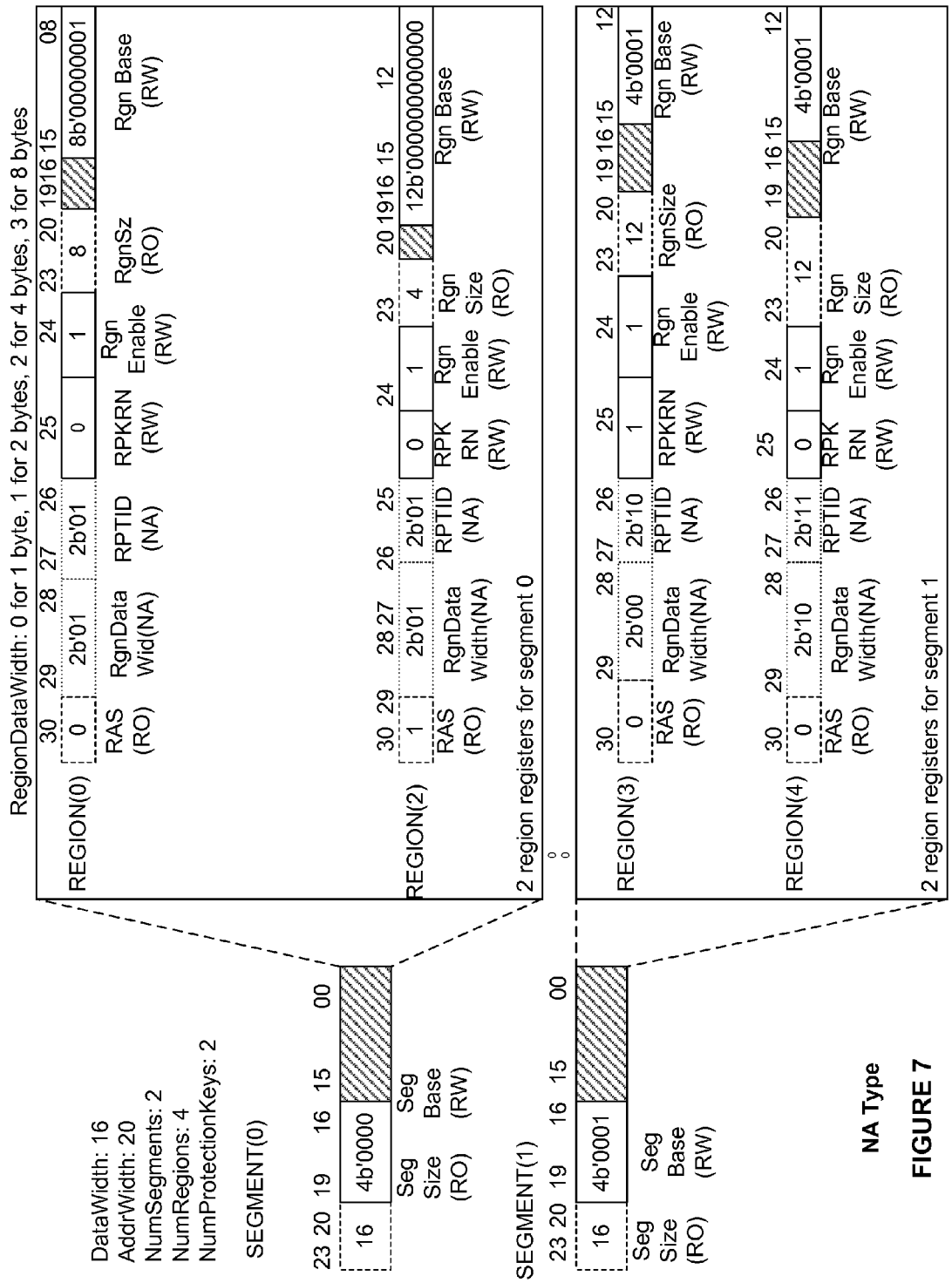
FIG. 7 illustrates one embodiment of the invention showing in table form, a definition of some possible not-accessible configuration parameters.

FIG. 6 and FIG. 7 show two almost identical address mapping and protection configurations. The register fields in FIG. 6 are of RO, RW, or NA type; however, for FIG. 7, all register fields are of NA type, plus, the un-used region register 1 is removed. From a first-order estimation, the number of flip-flops (also referred to as flops) saved in FIG. 7 is 82; that is no flops are used in the address map (308) and the protection key map (310) as shown in the center of FIG. 3. Also, note that, if (1) the address width of the hardware module is reduced from 20 to 17, and (2) the number of protection IDs is scaled down to 8, additional buffer register bits and signal wires can be saved versus the FIG. 6 case.

As mentioned previously, a specification language needs to be provided so that a designer may easily specify a minimum design for a product. The following lists, in one embodiment of the invention, an example specification as shown in FIG. 6:

```
Address Mapping and Protection Module {
        DataWidth: 16
        AddrWidth: 20
        Endianess: little
        NumSegments: 2
        Num Regions: 5
        NumProtectionKeys: 2
        NumProtectionKeyIDs: 16
        SEGMENT(0) {
             SegmentSize: 64KB { access RO }
             SegmentBase: 0x00000 { access RW }
        }
        SEGMENT(1) {
             SegmentSize: 64KB { access RO }
             SegmentBase: 0x10000 { access RW }
        }
        REGION(0) {
            Inside SEGMENT(0)
            RegionSize: 256B { access RO }
            RegionBase: 0x00100 { access RW }
            Region ProtectionKeyRegisterNum: 0 { access RW }
            RegionDataWidth: 2B { access NA }
            RegionPhysicalTargetID: link to ServiceModule 1 using "targetselect pin 1" {
    access NA }
            RegionAddressSpace: 0 { access RO }
            Region Enable: Yes { access RW }
        }
        REGION(1) {
            Inside SEGMENT(0)
            RegionSize: 4KB { access RO }
            RegionBase: 0x01000 { access RW }
            Region ProtectionKeyRegisterNum: 1 { access RW }
            RegionDataWidth: 2B { access NA }
            RegionPhysicalTargetID: link to ServiceModule 1 using "targetselect pin 1" {
    access NA }
```

```
            RegionAddressSpace: 1 { access RO }
            Region Enable: No { access RW }
        }
        REGION(2) {
            Inside SEGMENT(0)
            RegionSize: 16B { access RO }
            RegionBase: 0x00000 { access RW }
            Region ProtectionKeyRegisterNum: 0 { access RW }
            RegionDataWidth: 4B { access NA }
            RegionPhysicalTargetID: link to ServiceModule 0 using "targetselect pin 0" { access NA }
            RegionAddressSpace: 0 { access RO }
            Region Enable: Yes { access RW }
        }
        REGION(3) {
            Inside SEGMENT(1)
            RegionSize: 4KB { access RO }
            RegionBase: 0x10000 { access RW }
            Region ProtectionKeyRegisterNum: 1 { access RW }
            RegionDataWidth: 1B { access NA }
            Region PhysicalTargetID: link to ServiceModule 2 using "targetselect pin 2" { access NA }
            RegionAddressSpace: 0 { access RO }
            Region Enable: Yes { access RW }
        }
        REGION(4) {
            Inside SEGMENT(1)
            RegionSize: 4KB { access RO }
            RegionBase: 0x11000 { access RW }
            Region ProtectionKeyRegisterNum: 0 { access RW }
            RegionDataWidth: 4B { access NA }
            Region PhysicalTargetID: link to ServiceModule 3 using "targetselect pin 3" { access NA }
            RegionAddressSpace: 0 { access RO }
            Region Enable: Yes { access RW }
        }
        PROTECTIONKEY(0) {
            ProtectionKeyBitVector: 0x007B { access RW and EC }
        }
        PROTECTIONKEY(1) {
            ProtectionKeyBitVector: 0x0085 { access RW and EC }
        }
```

For the above example (also shown in FIG. 6), there are 2 segments and 5 address regions; the address region 1 is disabled at the initialization time (i.e., the region register's Region Enable field is set to "No"), but can be re-configured at run-time because the field is read/writable. There are two protection key registers and each has a 16-bit bit vector. The example also specifies the following at power-on:

The request address width is 20 bits and data word size is 16 bits.

There are four service modules: ServiceModule 0, 1, 2, and 3.

Address region 0, 1, and 2 exist in the address segment 0 and are based at address 0x00100, 0x01000, and 0x0000, and of size 256 bytes, 4K bytes, and 16 bytes, respectively. The region register 1 is not enabled at the current time, but, can be used as a future addition.

Address region 3 and 4 exist in the address segment 1 and are based at address 0x10000 and 0x11000, respectively; both are 4K-byte in size.

Requests coming from processing units using Protection ID 0, 1, 3, 4, 5, and 6 (the ProtectionKeyBitVector of 0x007B) can go to ServiceModule 0, 1, and 3, depending on the request address. Requests coming from processing units using Protection ID 0, 2, and 7 (the ProtectionKeyBitVector of 0x0085) can go to ServiceModule 2, if the request address falls into the address region 3.

For the design shown in FIG. 7, its specification looks like the following:

```
Address Mapping and Protection Module {
    DataWidth: 16
    AddrWidth: 20
    Endiness: little
    NumSegments: 2
    Num Regions: 4
    NumProtectionKeys: 2
    NumProtectionKeyIDs: 16
    SEGMENT(0) {
        SegmentSize: 64KB { access NA }
        SegmentBase: 0x00000 { access NA }
    }
```

-continued

```
SEGMENT(1) {
    SegmentSize: 64KB { access NA }
    SegmentBase: 0x10000 { access NA }
}
REGION(0) {
    Inside SEGMENT(0)
    RegionSize: 256B { access NA }
    RegionBase: 0x00100 { access NA }
    Region ProtectionKeyRegisterNum: 0 { access NA }
    RegionDataWidth: 2B { access NA }
    RegionPhysicalTargetID: link to ServiceModule 1 using "targetselect pin 1" { access NA }
    RegionAddressSpace: 0 { access NA }
    Region Enable: Yes { access NA }
}
REGION(2) {
    Inside SEGMENT(0)
    RegionSize: 16B { access NA }
    RegionBase: 0x00000 { access NA }
    Region ProtectionKeyRegisterNum: 0 { access NA }
    RegionDataWidth: 4B { access NA }
    Region PhysicalTargetID: link to ServiceModule 0 using "targetselect pin 0" { access NA }
    RegionAddressSpace: 0 { access NA }
    Region Enable: Yes { access NA }
}
REGION(3) {
    Inside SEGMENT(1)
    RegionSize: 4KB { access NA }
    RegionBase: 0x10000 { access NA }
    Region ProtectionKeyRegisterNum: 1 { access NA }
    RegionDataWidth: 1B { access NA }
    Region PhysicalTargetID: link to ServiceModule 2 using "targetselect pin 2" { access NA }
    RegionAddressSpace: 0 { access NA }
    Region Enable: Yes { access NA }
}
REGION(4) {
    Inside SEGMENT(1)
    RegionSize: 4KB { access NA }
    RegionBase: 0x11000 { access NA }
    Region ProtectionKeyRegisterNum: 0 { access NA }
    RegionDataWidth: 4B { access NA }
    Region PhysicalTargetID: link to ServiceModule 3 using "targetselect pin 3" { access NA }
    RegionAddressSpace: 0 { access NA }
    Region Enable: Yes { access NA }
}
PROTECTIONKEY(0) {
    ProtectionKeyBitVector: 0x007B { access NA and EC }
}
PROTECTIONKEY(1) {
    ProtectionKeyBitVector: 0x0085 { access NA and EC }
}
```

As mentioned in the description, and as shown in FIG. 4, at one of the final stages, a post-processing tool, which takes the specified design (such as the specification text shown above) as input, is used and generates an optimized hardware Netlist for the address mapping and protection hardware.

Thus, what has been disclosed is a method and apparatus of a configurable address mapping and protection hardware for on-chip systems.

Referring back to FIG. 1, FIG. 1 illustrates a network environment 100 in which the techniques described may be applied. The network environment 100 has a network 102 that connects S servers 104-1 through 104-S, and C clients 108-1 through 108-C. As shown, several systems in the form of S servers 104-1 through 104-S and C clients 108-1 through 108-C are connected to each other via a network 102, which may be, for example, an on-chip communication network. Note that alternatively the network 102 might be or include one or more of: inter-chip communications, an optical network, the Internet, a Local Area Network (LAN), Wide Area Network (WAN), satellite link, fiber network, cable network, or a combination of these and/or others. The servers may represent, for example: a master device on a chip; a memory; an intellectual property core, such as a microprocessor, communications interface, etc.; a disk storage system; and/or computing resources. Likewise, the clients may have computing, storage, and viewing capabilities. The method and apparatus described herein may be applied to essentially any type of communicating means or device whether local or remote, such as a LAN, a WAN, a system bus, on-chip bus, etc. It is to be further appreciated that the use of the term client and server is for clarity in specifying who initiates a communication (the client) and who responds (the server). No hierarchy is implied unless explicitly stated. Both functions may be in a single communicating device, in which case the client-server and server-client relationship may be viewed as peer-to-peer. Thus, if two devices such as 108-1 and 104-S can both initiate and respond to communications, their communication may be viewed as peer-to-peer. Likewise, communications between 104-1 and 104-S, and 108-1 and 108-C may be viewed as peer to peer if each such communicating device is capable of initiation and response to communication.

Referring back to FIG. 2, FIG. 2 illustrates a system 200 in block diagram form, which may be representative of any of the clients and/or servers shown in FIG. 1. The block diagram is a high level conceptual representation and may be implemented in a variety of ways and by various architectures. Bus system 202 interconnects a Central Processing Unit (CPU) 204, Read Only Memory (ROM) 206, Random Access Memory (RAM) 208, storage 210, display 220, audio, 222, keyboard 224, pointer 226, miscellaneous input/output (I/O) devices 228, and communications 230. The bus system 202 may be for example, one or more of such buses as an on-chip bus, a system bus, Peripheral Component Interconnect (PCI), Advanced Graphics Port (AGP), Small Computer System Interface (SCSI), Institute of Electrical and Electronics Engineers (IEEE) standard number 1394 (FireWire), Universal Serial Bus (USB), etc. The CPU 204 may be a single, multiple, or even a distributed computing resource. Storage 210, may be Compact Disc (CD), Digital Versatile Disk (DVD), hard disks (HD), optical disks, tape, flash, memory sticks, video recorders, etc. Display 220 might be, for example, a Cathode Ray Tube (CRT), Liquid Crystal Display (LCD), a projection system, Television (TV), etc. Note that depending upon the actual implementation of the system, the system may include some, all, more, or a rearrangement of components in the block diagram. For example, an on-chip communications system on an integrated circuit may lack a display 220, keyboard 224, and a pointer 226. Another example may be a thin client might consist of a wireless hand held device that lacks, for example, a traditional keyboard. Thus, many variations on the system of FIG. 2 are possible.

Another embodiment of a protection mechanism is described where the initiator ID and request bits exist in two separate fields unlike the protection ID. A target intellectual property block has an associated protection mechanism with logic configured to restrict access for the requests to the target intellectual property block. The request's access is restricted based on 1) access permissions associated with a region within the target intellectual property block and 2) attributes of the request trying to access that region.

Figure 8:
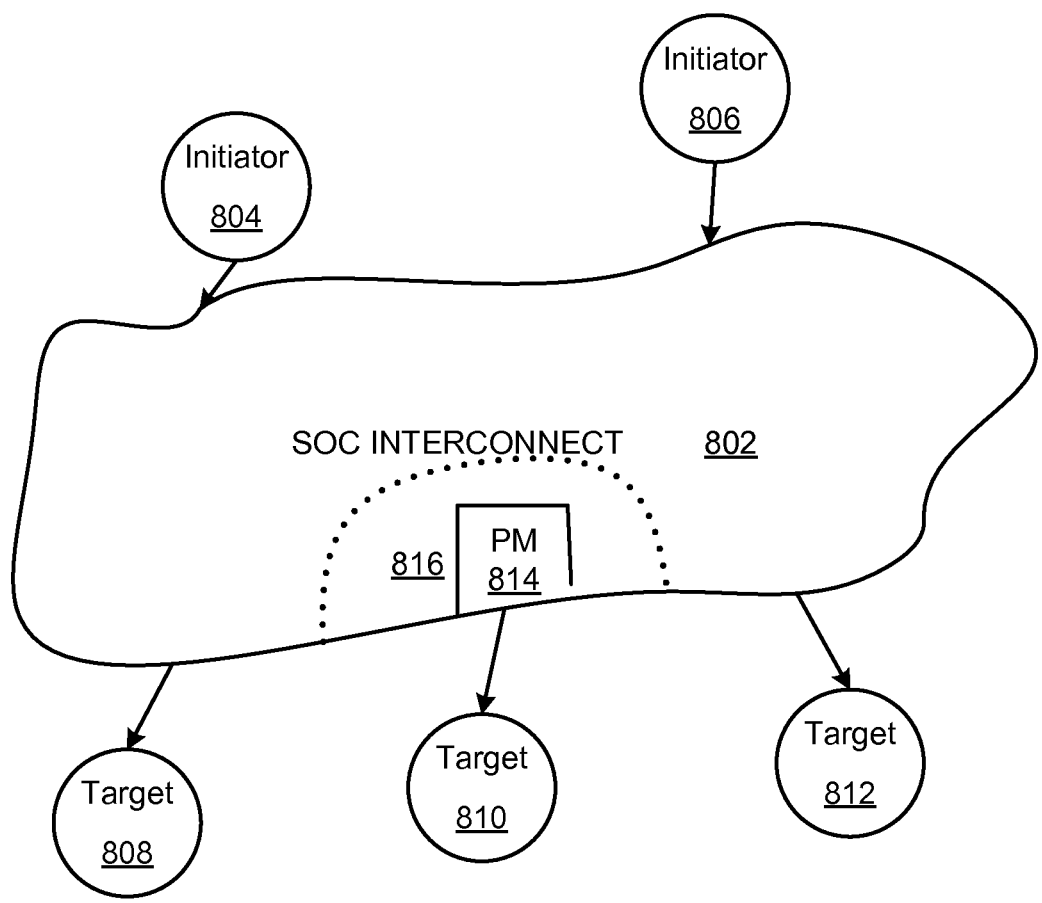
FIG. 8 illustrates an embodiment of a generic System-on-Chip (SOC) interconnect, including a hardware protection mechanism being composed of logic.

FIG. 8 illustrates an embodiment of a generic System-on-Chip (SOC) interconnect, including a hardware protection mechanism being composed of logic. FIG. 8 shows a generic SOC interconnect 802 with several initiator intellectual property blocks 804, 806 connected to several target intellectual property blocks 808-812. Initiator intellectual property blocks send requests to the target intellectual property blocks and receive responses back. Access to the second target intellectual property block 810 is restricted via a hardware protection mechanism 814. An agent 816 for the second target intellectual property block 810 may facilitate communications with the interconnect 802 on behalf of the target intellectual property block 810. The agent 816 contains the protection mechanism 814. The protection mechanism 814 may include protection-region logic to establish access permissions for one or more protection regions within the target. The protection mechanism 814 may also contain initiator group logic to create separate read access permissions and write access permissions for each group of initiator intellectual property blocks as well as other blocks of logic. The access protection mechanism 814 may be included with the second target intellectual property block 810 since handset applications in portal devices, such as cell phones, are now carrying an increasing amount of protected data content. The protection mechanism 814 lets specified initiator intellectual property blocks, such as the first initiator intellectual property block 804, have specified access to regions within a target intellectual property block, and sometimes only when they are performing specified roles.

The target intellectual property blocks 808-812 field and service requests from any of the initiator intellectual property blocks 804-806 in the system-on-chip network. The interconnect 802 transports a request with security identification information such as Initiator intellectual property block identification and dynamic role identification information. The second target intellectual property block 810 has an associated protection mechanism 814 with logic configured to restrict access for the requests to the second target intellectual property block 810 based on access permissions associated with an address region within the second target intellectual property block 810 and attributes of the request trying to access that region. The protection mechanism 814 being composed of logic provides an on-chip hardware-level firewall function that checks access and reports errors. The protection mechanism 814 also allows multiple flexible protection regions within the same target to be created. Multiple flexible protection regions associated with a target intellectual property block may be needed where physical resources in the target intellectual property block are shared among multiple initiator intellectual property block and more than one type of data content needs to be protected.

Note, an intellectual property block may be a discrete wholly integrated functional block of logic that performs a particular function, such as a memory component, a wireless transmitter component, a Central Processing Unit (CPU), Digital Signal Processors, hardware accelerators such as Moving Pictures Experts Group (MPEG) video compression component, Graphics engine component, etc. for a System On a Chip (SOC). Initiator intellectual property blocks 804-806 on the SOC are generally CPUs, multimedia chip sets, etc. Target intellectual property block 808-812 IP cores are generally Memory Schedulers, PCI bus controllers, memories, etc. The role of initiator and target may change depending upon what block is requesting a service access and which block services that request.

Figure 9:
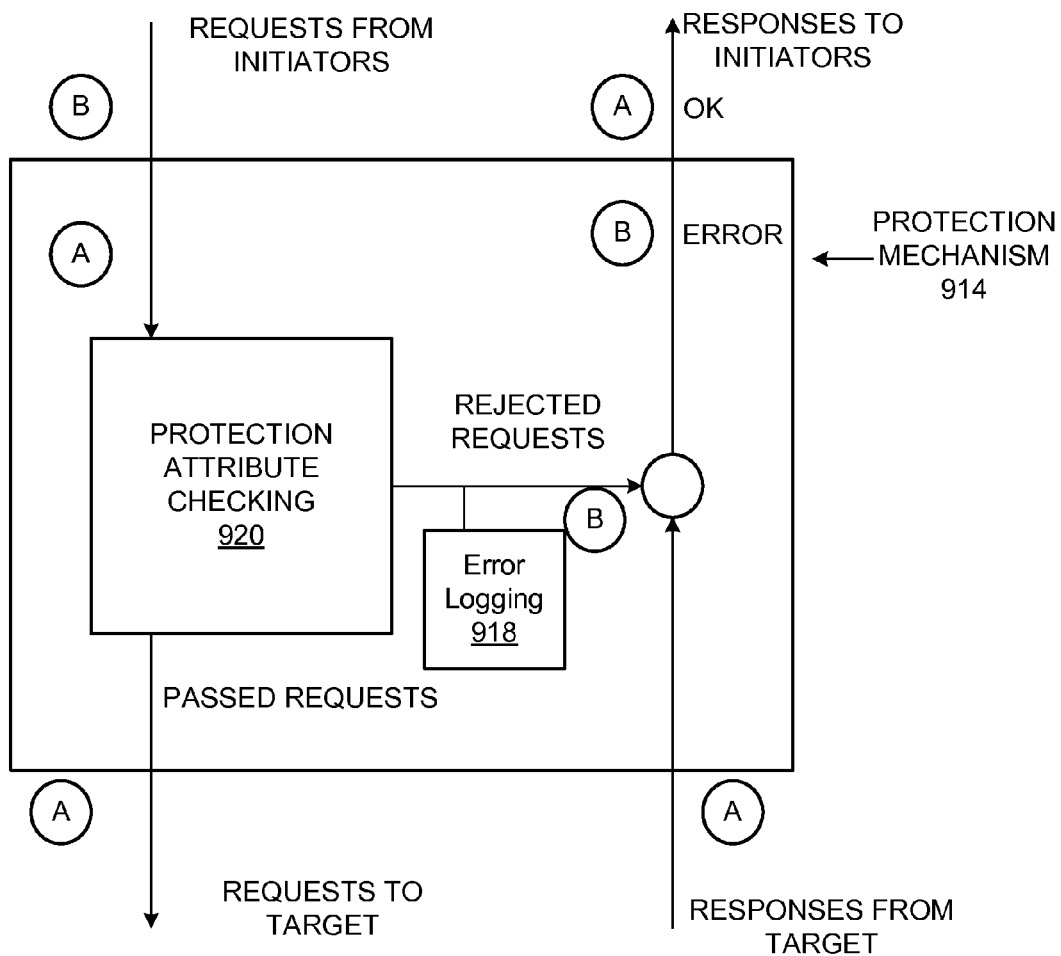
FIG. 9 illustrates an embodiment of a SOC and how a request with one set of attributes is allowed to access the target intellectual property block, while another request with different attributes is rejected.

FIG. 9 illustrates an embodiment of a SOC and how a request with one set of attributes is allowed to access the target intellectual property block, while another request with different attributes is rejected. FIG. 9 shows some details of this hardware protection mechanism 914 and how requests are processed through this logic. On the top left, requests arrive from initiator intellectual property blocks. Two requests A and B are shown to arrive. As discussed, access for the request to the target intellectual property block is restricted based on the attributes of the request. The attributes of the request may include the address of the portion within the target intellectual property block attempting to be accessed, the type of request, such as whether the request was a read or write, the initiator ID of the initiator intellectual property block that launched the request, and other attribute bits associated with the request that may dynamically change, such as MReqInfo bits, indicating the operating or security mode that initiator intellectual property block was in when the initiator intellectual property block issued the request. The attributes of these requests are checked, and one by one it is decided whether a given request is allowed to pass through the protection mechanism 914 to the target intellectual property block (as shown for request A) or rejected (as shown for request B). Thus, a request is interrogated for permissions before being passed to the target intellectual property block (regardless of whether the request is part of a burst or not.)

If a request is passed to the target intellectual property block, the corresponding response from the target intellectual property block is passed back to the initiator intellectual property block. Rejected requests receive an error response. Error logging logic 918 (discussed in more detail later in FIG. 18) may connect to the rejected request output of the protection attribute checking logic 920. The protection attribute checking logic 920 may consist of protection-region logic and initiator group logic. Thus, the hardware protection mechanism 914 that can be used to restrict access to a specific target intellectual property block of the system-on-chip (SOC) interconnect. As discussed, a hardware level protection mechanism 914 is important in the context of, for example, copyright protected content being downloaded into a shared memory of a device that is not under control of the copyright holder, for example.

Figure 10:
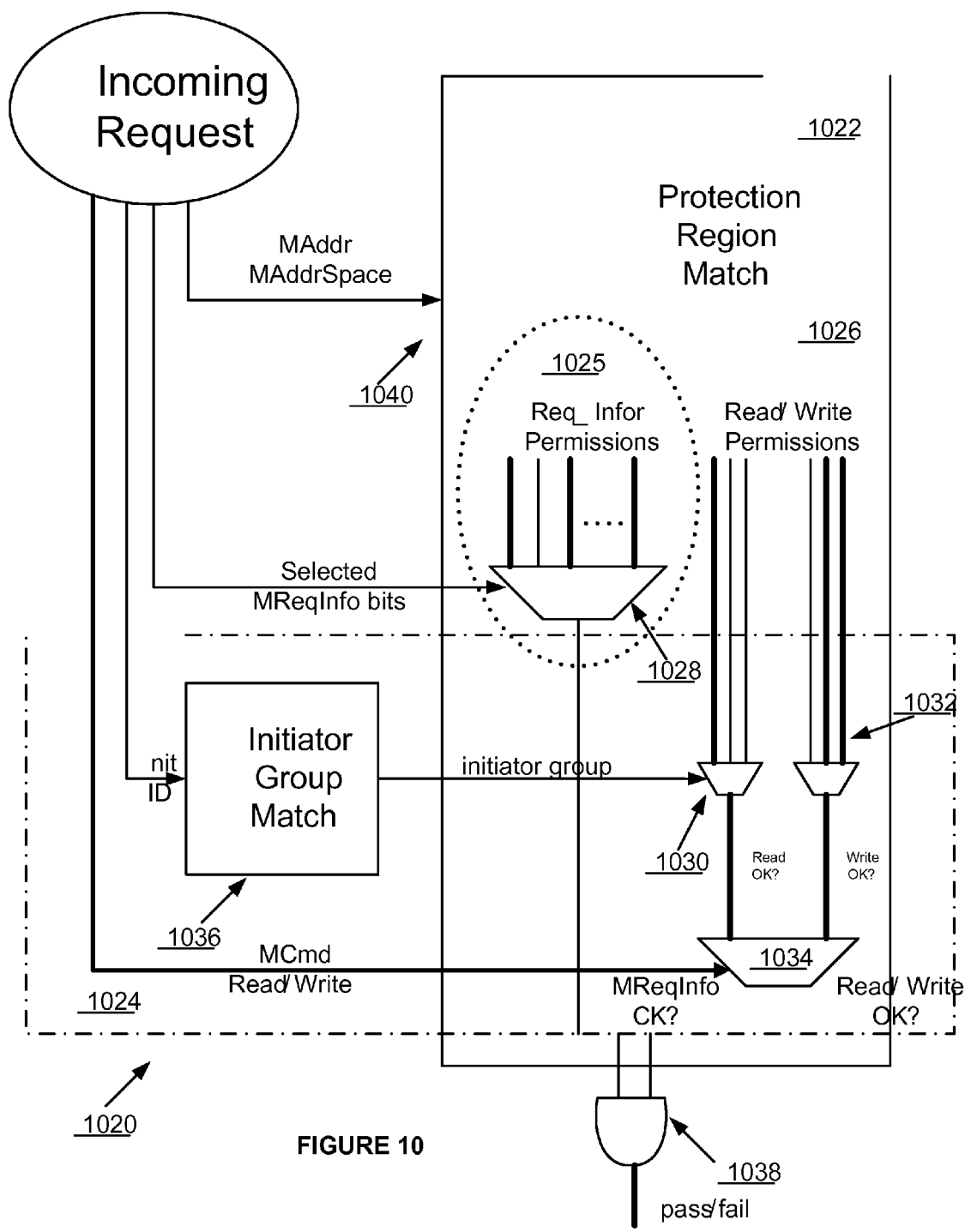
FIG. 10 illustrates a block diagram of an embodiment of a hardware protection mechanism that protects access to a physical target intellectual property block or portions of regions within that target intellectual property block based on 1) which initiator intellectual property block is making a request, 2) the type of request such as a read request or a write request, and 3) dynamic variables that can be attached along with the request such as the operating or security mode of the initiator intellectual property block at the time the request is generated.

FIG. 10 illustrates a block diagram of an embodiment of a hardware protection mechanism that protects access to a physical target intellectual property block or portions of regions within that target intellectual property block based on 1) the address within the target intellectual property block of the request, 2) which initiator intellectual property block is making a request, 3) the type of request such as a read request or a write request, and 4) dynamic variables that can be attached along with the request such as the operating or security mode of the initiator intellectual property block at the time the request is generated. FIG. 10 shows a possible implementation of the attribute-checking portion of the hardware protection mechanism. The protection attribute checking logic 1020 may consist of protection-region logic 1022 and permission checking logic 1024 An example implementation of the protection-region logic 1022 is the protection-region address matching logic 1026 with programmable registers to store access permission bits. An example implementation of the initiator group logic 1024 is the initiator group matching logic 1036 with programmable registers to store initiator IDs forming the groups and the second multiplexer 1030 through fourth multiplexer 1034. An example of the dynamic attribute checking logic 1025 is logic to select the dynamic attribute bits, such as MReqInfo bits, from the incoming request and the first multiplexer 1028.

The protection region logic 1022 determines the access permission bits associated with particular protection region through an address decoding of the destination address of the request. The protection region logic 1022 matches the protection region associated with the address of the request and provides the permission bits associated with that protection region. The initiator group logic 1024 determines whether the request can pass through to the target intellectual property block based on the initiator intellectual property block being in a specific group of initiator intellectual property blocks and the request being a read or write. The dynamic attribute checking logic 1025 determines whether the request can pass through to the target intellectual property block based on dynamic attributes of the request. Overall, the multiplexers then select permission bits from the determined permission bits for a particular protection region based on attributes of the request. A comparator circuit 1038, such as the AND logic gate, couples to the initiator group logic 1024 and the dynamic attribute checking logic 1025 portion of the protection region logic 1022 in order to determine if the attributes of the request satisfy the access permissions of the initiator group logic 1024 and the dynamic attribute checking logic.

Several attributes of the request are used to determine whether a request should be allowed to proceed (pass) or whether a particular request should be rejected (fail). The protection-region logic 1022 can configure protection regions within the address space of specified target intellectual property blocks. Protection regions subdivide a target intellectual property block's address space. Thus, the protection-region logic 1022 may divide the target intellectual property block into two or more protection regions that can overlap in address spacing, where each protection region may be configured to possess different access permissions to access that protection region. The protection-region logic 1022 determines access permissions for the one or more protection regions.

The protection mechanism may restrict access to these regions to merely requests for those initiator intellectual property blocks with the required attributes. The attributes of the request including the destination address of the region within the target intellectual property block may be used to look up permissions in a table. Each table entry contains read access permission information, write access permission information, and access permission information for attribute bits associated with the request that may dynamically change.

The protection region match logic 1026 decodes address fields in a request to determine the destination of the request. In the protection region match logic 1026, the target intellectual property block address (MAddr) and address space (MAddrSpace) of the request are used to match one of multiple protection regions within the address space of the target intellectual property block. The target intellectual property block address (MAddr) and address space (MAddrSpace) identifies by address where/what inside the target intellectual property block the request is trying to access. The organization of the protection regions (explained later) guarantees that exactly one region is matched. Note essentially, each different protection region in a target intellectual property block is capable of having different access protection requirements for a given request called access protection permissions.

For the protection region matched to the destination address of the request, a set of access permission bits is passed out the permissions outputs, corresponding to read/write access permissions determined by the initiator group matching logic 1036, and access permissions determined by the dynamic attribute checking logic.

The initiator group logic 1024 creates an index of one or more groups of initiators, where each initiator group has separate read access permissions and write access permissions. For read/write permissions, the initiator group match logic 1036 matches the initiator ID (Init ID) of the initiator intellectual property block to being in an index for the groups of initiator intellectual property blocks. The multiplexers 1030 and 1032 are used to select the correct read and write permission bit. Depending on whether the request is a read request or write request (i.e. a MCmd read/write portion of a request may determine the type of request), either the read permission bit or the write permission bit is the selected by multiplexer 1034. Each initiator intellectual property block group is capable of having distinct and separate read permissions and write permissions. This is discussed in more detail in FIGS. 14 and 15. The other portion of the permission check uses attribute bits associated with the incoming request that may dynamically change during the operation of the initiator intellectual property block to select the corresponding dynamic attribute permission bit. This is discussed in more detail in FIGS. 16 and 17.

To summarize the above, the access permissions for the initiator ID and the type of request are decoded in parallel with the target address decoding when determining what are the access protection permissions associated with that target intellectual property block for a specific type of request by that particular initiator intellectual property block ID.

Finally, the selected dynamic attribute permission bit and the selected read or write permission bit are ANDed together by the comparator 1038 to make up the final pass/fail determination. In this manner, it is possible to reject requests depending on which initiator intellectual property block they come from, the type of request on whether they are read requests or write requests, depending on their dynamically changeable attributes, and depending on which portion of the target intellectual property block's address space they are targeting.

Note, sample logic component have been shown in this implementation. Accordingly, other logic components such adders, etc, could also be implemented. Also, table lookup buffers and software coding could be used to implement some of these functions. Additionally, the computations of the address decoding may be carried out in power of two sized amounts of address space.

Figure 11C:
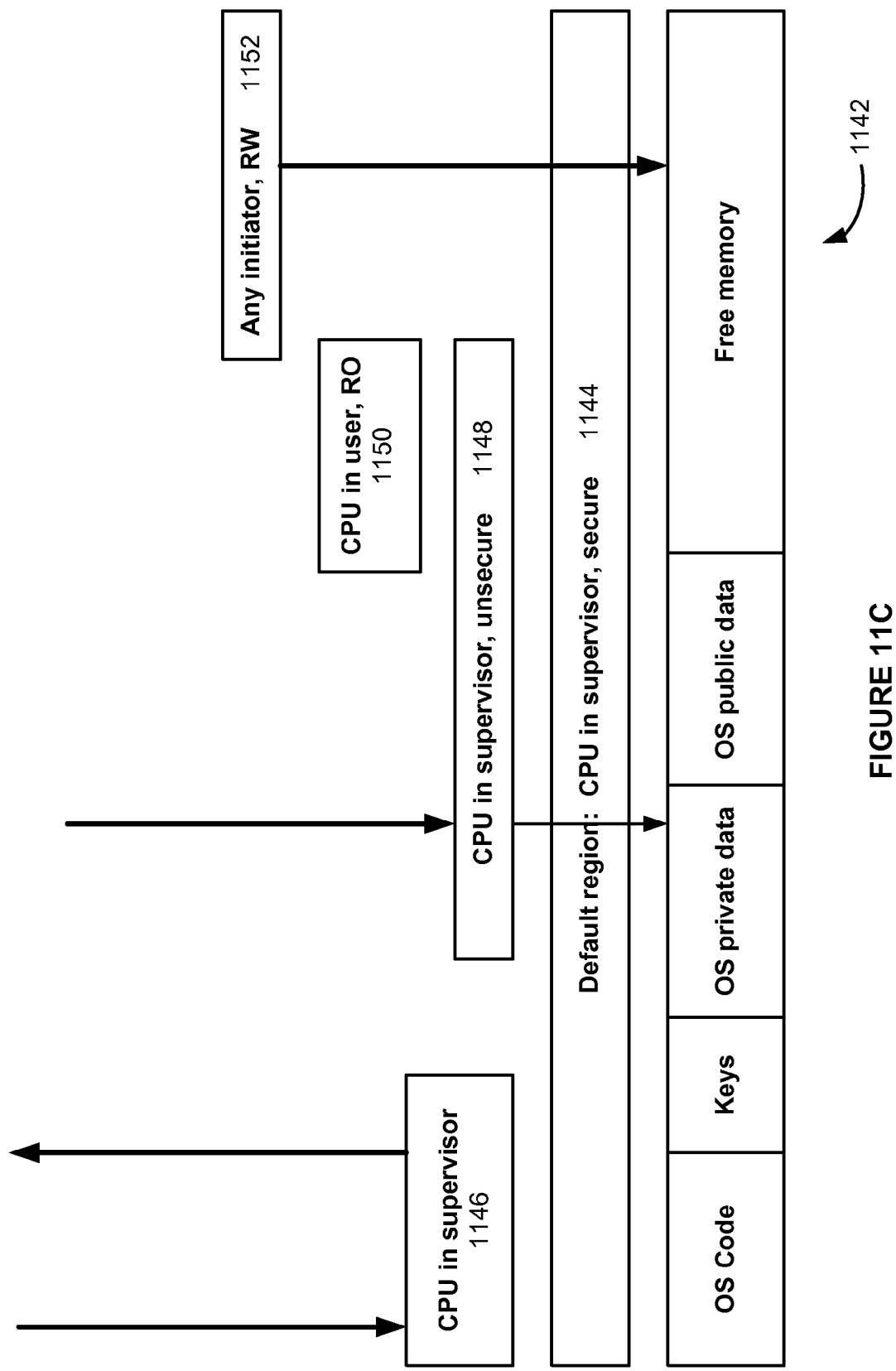

FIGS. 11*a*-11*c* illustrate block diagrams of an embodiment of the address space of a target intellectual property block with several overlapping protection regions. FIGS. 11*a* and 11*b* show how a target intellectual property block's address space can be divided into several protection regions 1142-1146. In FIG. 11*a*, three example protection regions are shown: a first protection region labeled A, a second protection region labeled B, and a third protection region labeled C. Each protection region has various access protection permissions associated with that protection region. A request trying to read or write to that protection region must meet those access protection permissions to access that region or be rejected. The access protection permissions may correspond to and establish the attributes of the request needed to access that level. Each protection region may be assigned to one of four priority levels. Priority level 1 is at the lowest, and priority level 4 is at the highest. If a request matches multiple protection regions at different priority levels, the permissions of the protection region at the highest level are applied. In this manner, only one set of protections applies to any particular request access. The access protection permissions may be more stringent or less stringent between two different priority levels and no required correlation as to which priority level must be more stringent.

One of the protection regions (in this example the third protection region labeled C) is sized to always cover the entire target intellectual property block 810 address space. That protection region, protection region C, is assigned priority level 1, the lowest priority level. Protection regions A and B are shown to be at priority level 2, which means that they are at a higher priority level than protection region C. Any request that falls in region B, for example would also fall into region C, since that region covers the entire address space of the target intellectual property block. However, since region B is at a higher priority level than region C, it takes precedence, and only the protection attributes of region B are applied to the request. As long as overlapping protection regions are required to be at different priority levels, and there is always a protection region that covers the entire target intellectual property block 810 (assigned to the lowest priority level), each request falls under exactly one protection region.

FIG. 11*b* shows how the three protection regions shown in FIG. 11*a* can be specified by giving a base starting address and length/size for each region. Through this address semantics, a region of where or what within a target intellectual property block can be defined. As will be described later in detail, both the access protection permissions associated with a protection region and the overall size of a protection region can be generated at 1) design time, or reprogrammed by software having a high enough security level, such as OS, during device operation, or a combination of both programming some non-changeable protection regions at design time and some protection regions that are programmably adjustable during the operation of the device. All protection regions may be a power-of-two in size and size aligned.

FIG. 11*c* illustrates an example layering of five protection regions in an example memory target intellectual property block. Different protection regions may exist in, for example, a Dynamic Random Access Memory (DRAM) 1142 in a SOC. This physical component in the SOC may need to be shared by all of the IP blocks on that chip. However, the chip designer may merely want a specific processor or graphics application software to have the right to write data to a dedicated area within the DRAM 1142 and one graphics processor to be able to read data out of dedicated area within the DRAM 1142. Similarly, a downloaded digital song with proprietary rights may be stored in another area with the DRAM 1142. The user may want merely the on chip music player, and no other component, to have the right to read data from that dedicated area within the DRAM 1142.

The protection-region logic may be programmed in its registers to divide the target intellectual property block (i.e. DRAM memory 1142) into two or more protection regions. The set of software programmable registers in the protection region match logic controls the base starting address parameter, a size parameter and a priority level parameter for each of the protection regions. In this example, five protection regions 1144-1152 have been formed. The programmed base starting address and length for each formed region can overlap in address spacing with other protection regions. Each protection region 1144-1152 may also be configured to possess different access permissions to access that protection region.

The first protection region 1144 covers the entire address space of the memory 1142 and has access permissions that require the initiator ID must be in the CPU initiator group and have dynamic attribute bits indicating the initiator was operating in both the supervisory mode and its highest security mode when the request was generated. The second protection region 1146 covers a small address space of the memory 1142 that overlaps with the first protection region 1144.

The second protection region 1146 has access permissions that require the initiator ID must be in the CPU initiator group and have dynamic attribute bits indicating the initiator was operating in the supervisory mode when the request was generated. The second protection region 1146 has a higher priority level than the first protection region 1144. As noted, the protection-region logic assigns each protection region a priority level. When protection regions overlap in address spacing, then the protection region with a highest assigned priority level takes precedence in the overlapped address range. This in combination with having a default region at the lowest priority level that covers the entire target intellectual property block ensures that each request is guaranteed to match exactly one protection region.

The remaining protection regions 1148-1152 are similarly programmed with access protection permissions, size parameters, and priority parameters. Note, the fourth protection region 1150 has access permission to service only read access requests from initiator IDs in the CPU initiator group.

Figure 12:
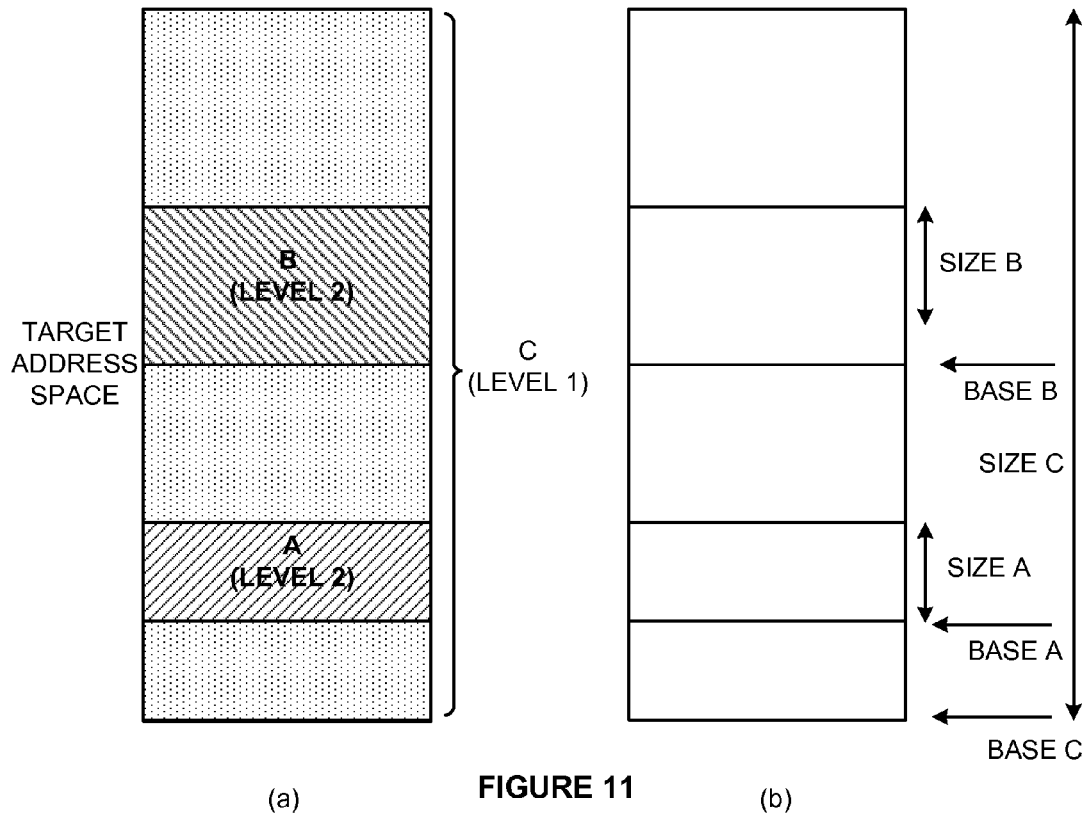
FIG. 12 illustrates a block diagram of an embodiment of how the parameters of the protection mechanism can be made programmable with software accessible registers.
Figure 12:
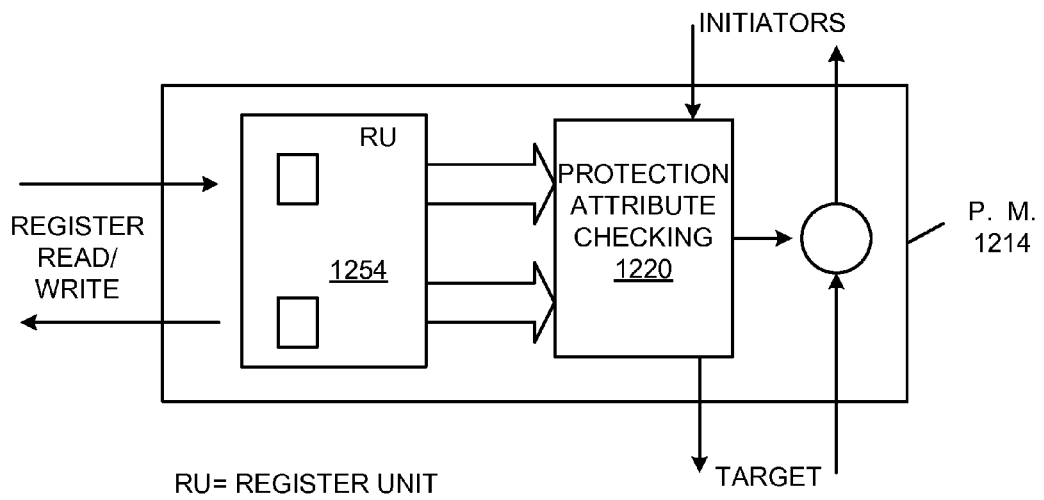

FIG. 12 illustrates a block diagram of an embodiment of how the parameters of the protection mechanism can be made programmable with software accessible registers. A set of register units is included in the protection mechanism 1214. Individual registers in the register unit 1254 can be read and written by a component with a high security level such as system software or a finite state machine (i.e. not application level software). As discussed, the contents of the registers are used to specify the attributes of the protection mechanism 1214, such as the base, size, and priority level of the protection regions. The contents of the registers are used to establish the access permissions. Access to the registers can itself be protected with another protection mechanism.

The user can be responsible for configuring protection for a target intellectual property block. The configuration can be set at design time or left programmable at run time. Each target intellectual property block with a programmable protection mechanism 1214 has its own protection mechanism register block 1254 that controls all request access to that target intellectual property block. A separate address sub-region can be assigned to the register block 1254 so that the security configuration can also be protected. The protection mechanism registers 1254 permit security settings for the target intellectual property block to be set and changed by software.

Note, the flexibility to be able to re-program the protection permissions during the operation of the device adds relatively no additional latency time to the logic that actually determines whether the access attributes of the request meet the protection permissions of a protected region within a target intellectual property block.

FIG. 13 illustrates a block diagram of an embodiment of a register defining the base starting address of the protection region, the size of the protection region, and a priority level of the protection region. The address field 1356 specifies the base starting address of the region, while the size field 1360 specifies its length/size. The size field 1360 may be encoded in a compressed form such that any content in that field is actually raised to an exponential amount, such as the power of two, to indicate actual length. A special size value of 0 can be used to indicate that the region is not used. A level field 1358 is used to assign a priority level to the protection region, to control ordering when multiple protection regions overlap. One register of this type may exist for each protection region, thus allowing the location and priority level of each protection region to be altered dynamically.

Therefore, the protection-region logic with these registers may create multiple protection regions at first period in time. At a second period of time, the size field 1360 of a particular protection region may be programmed to be zero in order to turn off this already created protection region. This allows multiple protection regions to be created for a target intellectual property block at first time, for example design time, and a second later time, during operation, condensing the size of unused protection regions within a single target intellectual property block to zero effectively turning off those unused protection regions and not wasting the minimum space required to have those unused protected regions exist during operation.

FIG. 14 illustrates a block diagram of an embodiment of an initiator group matching logic with programmable registers to store initiator IDs and the initiator groups. The initiator group matching logic 1436 can aggregate initiator IDs of initiator intellectual property blocks to form initiator intellectual property block groups programmable by the user, which condenses the amount of potential initiators in a system. Many initiator intellectual property block threads have the same access permissions. Each initiator ID is assigned to exactly one initiator intellectual property block. Organizing initiator intellectual property blocks into initiator intellectual property block groups is useful because it reduces the total number of distinct permission bits that are needed, given that many initiator intellectual property blocks often require the same set of permissions for a given target intellectual property block. FIG. 14 shows how initiator intellectual property blocks can be grouped together into initiator intellectual property block groups based on the type of initiator intellectual property block, being part of a collective work group, or other group defined by the end user or chip designer. In the sample implementation shown in FIG. 10, the initiator intellectual property block ID of the incoming request is used to find the initiator intellectual property block group to which the initiator intellectual property block belongs. This initiator group is then used to select the correct read and write permission bits. In this example, the initiator ID from initiator B is found in Group 1.

FIG. 15 illustrates a block diagram of an embodiment of a register controlling read access and write access to a target intellectual property block. FIG. 15 shows a sample layout for a register 1562 that is used to specify read permissions 1566 and write permissions 1564 indexed by initiator intellectual property block group. One bit of read permissions 1566 is used for each initiator intellectual property block group, forming a bit vector of read permissions. Similarly, one bit of write permissions 1564 is used for each initiator intellectual property block group. Thus, Read/write permissions can be stored in registers as bit vectors, one bit per initiator intellectual property block group. In this manner, individual read and write permissions can be assigned to each initiator intellectual property block group, and altered dynamically. For example, the write permission 1564 may contain a logical "1" bit in the slot for initiator intellectual property block group 1 and a logical "0" bit for the other group slots. The logical "1" bit write permission for initiator intellectual property block group 1 means from example register in FIG. 14 that write requests from initiator intellectual property block B are authorized access to this protection region of the target intellectual property block.

Note, a bit vector may be an array of bits that can often be handled very efficiently since a computer word is an array of bits.

Thus, the read protection permissions 1566 for a target intellectual property block are independent from the write protection permissions 1564 for that target intellectual property block even though the read and write request are associated with the same initiator intellectual property block In FIG. 10, the first multiplexer 1028 through the fourth multiplexer 1034, select access protection permissions as a bit vector directly from output of the address decoder portion of the protection region matching logic 1026 without having to further decode what permissions are associated with that address. The access protection permissions associated with a particular region within a target intellectual property block are encoded in the bit vector pattern selected by the multiplexers.

FIG. 16 illustrates a block diagram of an embodiment of dynamic attribute checking logic to look up in a table permissions that are associated with dynamically changeable attributes of a request by a bit vector pattern. The dynamic attributes of a request can be used to look up a dynamic attribute permission table 1666 for one region of the target intellectual property block. The dynamic attributes that may be added onto a request. The bit pattern corresponds to dynamically changeable characteristics of the initiator whom sent this request. These dynamic attributes can then be mapped to dynamic attribute access permissions in the table 1666. Thus, each initiator intellectual property block request may be tagged with dynamic system-defined attributes that capture information such as: data or code access, security mode of initiator intellectual property block (N-level); security regime including pools of mutually-secure initiator intellectual property blocks; and protection regime like a MMU for the "other" initiator intellectual property blocks. These system-defined attributes may dynamically change or be reprogrammed during the operation of the device.

In this example, there are three dynamic attribute bits associated with each request. For each possible combination of dynamic attribute bits (in this case there are 8 combinations), a single access permission bit is assigned in the table 1666. In the example, requests with dynamic attribute bits with the pattern 001 are allowed to pass, whereas requests with dynamic attribute bits 000, 010, or 111 are rejected. Thus, dynamically changeable permissions can be looked up in a table by a bit vector pattern.

FIG. 17 illustrates a block diagram of an embodiment of a register controlling dynamic attributes needed for a request to access a target intellectual property block. The register 1768 has a bit vector layout for storing dynamic attribute permissions. The individual permission bits shown in FIG. 16 are stored in successive bits of the register. Thus, the dynamically changeable permissions, such as MReqInfo permissions, can be stored in registers as bit vectors. In this manner, the dynamic attribute permission patterns can be altered dynamically.

Referring to FIG. 10, in this example, if the dynamic attribute bits (such as MReqInfo bits) associated with the request are 000, and then a logical 0 comes out of the first multiplexer 1028. In this example, if the dynamic attribute bits 0 associated with the request are 001, then a logical 1 comes out of the first multiplexer 1028. The protection permissions are generated at the output of the protection region matching logic 1026 in bit vector form to enable efficient processing of this partially decoded information with multiplexers and Boolean logic gates.

FIG. 18 a block diagram of an embodiment of error logging logic that records details of a failed request, and that reports the failed access attempt to either or both the initiator intellectual property block that initiated the failed request or to other components. The error logging logic 1818 may log a request rejected by the protection attribute checking logic 1820 portion of the protection mechanism 1814. When a particular request is rejected by the protection attribute checking logic 1820, not only is an error indication returned to the initiator intellectual property block, but also some attributes about the request are logged in the error logging logic 1818. The details of the failed request are logged, which can be retrieved later by reading the error logging registers. Useful attributes to log may be the initiator intellectual property block ID, identification of the protection region that blocked the request, the type of request (read or write), and the dynamic attribute bits of the request. In addition, the error logging logic 1818 may include dynamic attribute information to indicate whether the attributes stored in the log represent a rejected request. An initiator intellectual property block may interrogate this status information to determine if any requests have been rejected by the protection mechanism and, if so, interrogate the stored attributes to associate a protection violation back to the original request that caused it and report the details of the failed access attempt.

In an embodiment, the error logging logic 1818 signals security violations to the requesting initiator intellectual property block, a second initiator intellectual property block, and/or a security controller. The signal may be implemented as a point-to-point connection, or may be multiplexed together with other signals. The signal may connect to an error input, a non-maskable interrupt input, or a security violation input at each destination. The second initiator intellectual property block may be an embedded or external microprocessor to enable software running on the microprocessor to manage recovery from the security violation and/or isolation of the requesting initiator intellectual property block. The security controller may be a secure state machine that monitors security policy violations and controls a security state (role) of each modal initiator intellectual property block in system. The security controller may also perform write requests to the error logging logic 1818 to clear old error log data. The presence of the error logging logic may allow the multiplexing of the security violation signals from multiple protection mechanisms and other sources, because a microprocessor or the security controller can interrogate the status bits to determine which protection mechanisms are signaling security violations.

Referring to FIGS. 11*a* and 11*b*, the protection mechanism 814 allows a user to change protection parameters of a protection region while not disrupting service in the device by allowing the creation of a new protection region within a target intellectual property block via the programmable registers. A user programs the creation of a new protection region with a size of 0, and assigned to address space overlapping with and actually occupies the same base starting address as an existing protection region. The user then copies all of the protection permissions associated with a protection region about to be modified, and then assigns a higher priority to the new protection region. For example, the replica region has the priority of the existing region plus one. Essentially, a replica of the about to be modified protection region is created via the programmable registers except the replica has a higher priority level then the old protection region. The replica protection region is then enabled by setting its size to be non-zero and match the same size as the existing region. The replica protection region with the higher priority level will then service/ be used to interrogate all incoming request. The old protection region may be freely modified/updated. When the modifications to the old protection region are complete, then the replica may be turn off/inactivated by programming the size field to zero for the replica protection region. Essentially, the replica protection region set with the higher priority level may be used as an overlay region to cover those periods when a new region is being set up or a region size is being changed. This allows secure software to switch off a protection region, update the configuration information related to the region with multiple individual write requests, and then re-enable the region with a final write request to set the size of the protection region. Thus, the protection mechanism allows secure updates of security permissions during operation of the device and without disrupting the operation of the device.

Overall, the protection mechanism being composed of logic provides a lot a scalability for the end user allowing the end user to program how many protection regions may exist in a target intellectual property block, the size of the regions, whether they overlap, what the protection permissions are to access those regions, such as type of request, initiator intellectual property block ID, dynamic information such as operating mode of initiator intellectual property block at the time the request was generated, etc., and later change those permissions.

The information representing the apparatuses and/or methods may be contained in an Instance, soft instructions in an IP generator, or similar machine-readable medium storing this information. The information representing the apparatuses and/or methods stored on the machine-readable medium may be used in the process of creating the apparatuses and/or methods described herein.

The IP generator may be used for making highly configurable, scalable System On a Chip inter-block communication system that integrally manages data, control, debug and test flows, as well as other applications. In an embodiment, an example intellectual property generator may comprise the following: a graphic user interface; a common set of processing elements; and a library of files containing design elements such as circuits, control logic, and cell arrays that define the intellectual property generator. The IP generator may be used in designing a System on a Chip (SOC). Traditionally, there exist two major stages of SOC design: front-end processing and back-end programming. Front-end processing consists of the design and architecture stages, which includes design of the SOC schematic. The front-end processing may include connecting models, configuration of the design, simulating and tuning during the architectural exploration. The design is simulated and tested. Front-end processing traditionally includes simulation of the circuits within the SOC and verification that they work correctly. The integration of the electronic circuit design may include packing the cores, verifying the cores, simulation and debugging.

Back-end programming traditionally includes programming of the physical layout of the SOC such as placing and routing, or floor planning, of the circuit elements on the chip layout, as well as the routing of all interconnects between components. Thus, the floor plan may be generated imported and edited. After this, the design may be outputted into a Netlist of one or more hardware design languages (HDL) such as Verilog, VHDL or Spice. A Netlist describes the connectivity of an electronic design such as the components included in the design, the attributes of each component and the interconnectivity amongst the components. After the Netlist is generated, synthesizing of the design with RTL may occur. Accordingly, back-end programming further includes the physical verification of the layout to verify that it is physically manufacturable and the resulting SOC will not have any function-preventing physical defects. The front-end views support documentation, simulation, debugging, and testing. The back-end files, such as a layout, physical LEF, etc are for layout and fabrication.

For purposes of discussing and understanding the invention, it is to be understood that various terms are used by those knowledgeable in the art to describe techniques and approaches. Furthermore, in the description, for purposes of explanation, numerous specific details are set forth in order to provide a thorough understanding of the present invention. It will be evident, however, to one of ordinary skill in the art that the present invention may be practiced without these specific details. In some instances, well-known structures and devices are shown in block diagram form, rather than in detail, in order to avoid obscuring the present invention. These embodiments are described in sufficient detail to enable those of ordinary skill in the art to practice the invention, and it is to be understood that other embodiments may be utilized and that logical, mechanical, electrical, and other changes may be made without departing from the scope of the present invention.

Some portions of the description may be presented in terms of algorithms and symbolic representations of operations on, for example, data bits within a computer memory. These algorithmic descriptions and representations are the means used by those of ordinary skill in the data processing arts to most effectively convey the substance of their work to others of ordinary skill in the art. An algorithm is here, and generally, conceived to be a self-consistent sequence of acts leading to a desired result. The acts are those requiring physical manipulations of physical quantities. Usually, though not necessarily, these quantities take the form of electrical, magnetic, or optical signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion, it is appreciated that throughout the description, discussions utilizing terms such as "processing" or "computing" or "calculating" or "determining" or "communicating" or "displaying" or the like, can refer to the action and processes of a computer system, or an electronic device, that manipulates and transforms data represented as physical (electronic) quantities within the electronic device or computer system's registers and memories into other data similarly represented as physical quantities within the electronic device and/or computer system memories or registers or other such information storage, transmission, or display devices.

The present invention can be implemented by an apparatus for performing the operations herein. This apparatus may be specially constructed for the required purposes, or it may comprise a general-purpose computer, selectively activated or reconfigured by a computer program stored in the computer. Such a computer program may be stored in a computer readable storage medium, such as, but not limited to, any type of disk including floppy disks, hard disks, optical disks, compact disk-read only memories (CD-ROMs), digital versatile disk (DVD), and magnetic-optical disks, read-only memories (ROMs), random access memories (RAMs), electrically programmable read-only memories (EPROM)s, electrically erasable programmable read-only memories (EEPROMs), FLASH memories, magnetic or optical cards, etc., or any type of media suitable for storing electronic instructions either local to the computer or remote to the computer.

The algorithms and displays presented herein are not inherently related to any particular computer or other apparatus. Various general purpose systems may be used with programs in accordance with the teachings herein, or it may prove convenient to construct more specialized apparatus to perform the required method. For example, any of the methods according to the present invention can be implemented in hard-wired circuitry, by programming a general-purpose processor, or by any combination of hardware and software. One of ordinary skill in the art will immediately appreciate that the invention can be practiced with computer system configurations other than those described, including hand-held devices, multiprocessor systems, microprocessor-based or programmable consumer electronics, digital signal processing (DSP) devices, set top boxes, network PCs, minicomputers, mainframe computers, and the like. The invention can also be practiced in distributed computing environments where tasks are performed by remote processing devices that are linked through a communications network. This communications network is not limited by size, and may range from, for example, on-chip communications to WANs such as the Internet.

The methods of the invention may be implemented using computer software. If written in a programming language conforming to a recognized standard, sequences of instructions designed to implement the methods can be compiled for execution on a variety of hardware platforms and for interface to a variety of operating systems. It will be appreciated that a variety of programming languages may be used to implement the teachings of the invention as described herein. Furthermore, it is common in the art to speak of software, in one form or another (e.g., program, procedure, application, driver, ... ), as taking an action or causing a result. Such expressions are merely a shorthand way of saying that execution of the software by a computer causes the processor of the computer to perform an action or produce a result.

It is to be understood that various terms and techniques are used by those knowledgeable in the art to describe communications, protocols, applications, implementations, mechanisms, etc. One such technique is the description of an implementation of a technique in terms of an algorithm or mathematical expression. That is, while the technique may be, for example, implemented as executing code on a computer, the expression of that technique may be more aptly and succinctly conveyed and communicated as a formula, algorithm, or mathematical expression. Thus, one of ordinary skill in the art would recognize a block denoting A+B=C as an additive function whose implementation in hardware and/or software would take two inputs (A and B) and produce a summation output (C). Thus, the use of formula, algorithm, or mathematical expression as descriptions is to be understood as having a physical embodiment in at least hardware and/or software (such as a computer system in which the techniques of the present invention may be practiced as well as implemented as an embodiment).

A machine-readable medium is understood to include any mechanism for storing or transmitting information in a form readable by a machine (e.g., a computer). For example, a machine-readable medium includes read only memory (ROM); random access memory (RAM); magnetic disk storage media; optical storage media; flash memory devices; electrical, optical, acoustical, or other form of propagated signals (e.g., carrier waves, infrared signals, digital signals, etc.); etc.

Thus, a method and apparatus for a configurable address mapping and protection architecture for on-chip systems have been described. While some specific embodiments of the invention have been shown the invention is not to be limited to these embodiments. For example, the protection mechanism has been shown implemented in an agent associated with the target. However the protection mechanism may be equally be located in the initiator, in the target, in the SOC network or out of the SOC network. Further, protection regions have been shown as being defined by their address spacing. However, other ways exist to define a region within a target. The invention is to be understood as not limited by the specific embodiments described herein, but only by scope of the appended claims.

We claim:

1. An apparatus, comprising:
an interconnect coupled and shared amongst a plurality of target intellectual property blocks including a first target intellectual property block, and a plurality of initiator intellectual property blocks including a first initiator intellectual property block, where the first target intellectual property block is configured to service and respond to transactions from the first initiator intellectual property block over the interconnect, wherein the interconnect has an associated protection mechanism with protection logic configured to restrict access for the transactions to the first target intellectual property block based on criteria including access permissions associated with a protection region for the first target intellectual property block, where the access permissions associated with the protection region at least include who is the source requesting access to the first target intellectual property block and the type of access being requested, where the interconnect is configured to route the transactions between the first initiator intellectual property block and the first target intellectual property block, where the protection logic is configurable to set the access permissions for two or more protection regions in the integrated circuit, where each protection region is associated with address spacing in the integrated circuit, where the protection mechanism compares to determine when attributes of the transaction satisfy the access permissions of a given protection region, where the protection mechanism is a firewall that is programmable to prevent unauthorized access to or from the two or more protection regions, and where at least the protection mechanism, the interconnect, the first initiator intellectual property block and the first target intellectual property block are located on and part of a System on a Chip.

2. The apparatus of claim 1, where the protection mechanism is a firewall with protection logic located in any one of 1) a target agent connected between the first target intellectual property block and the interconnect, 2) the interconnect, 3) and portions of the firewall with protection logic found in both of the target agent and interconnect; and the firewall has configurable registers to store access permissions.

3. The apparatus of claim 2, where the firewall with protection logic includes a comparator to make a comparison between the transaction and the access permissions for the protection region to determine whether the transaction should be delivered to the first target intellectual property block based upon at least configured parameters for the access permissions in the configurable registers.

4. The apparatus of claim 1, where the access permissions associated with each protection region also includes a destination address space being accessed.

5. The apparatus of claim 1, wherein the protection logic of the protection mechanism further includes software accessible registers to allow parameters that define a space covered by each protection region and its access permissions to be programmable at run time.

6. The apparatus of claim 1,
wherein the protection logic of the protection mechanism is configurable to create separate read request access permissions and write request access permissions for each group of initiator intellectual property blocks, and the protection logic has programmable registers to store the separate read request access permissions and write request access permissions.

7. The apparatus of claim 1, wherein the protection mechanism further comprises:
protection logic configured to create two or more protection regions including a default region at a lowest priority level that covers the address spacing for the entire first target intellectual property block.

8. The apparatus of claim 1, wherein the protection logic of the protection mechanism is configured to allow a user to program both 1) a base starting address of the protection region and a size, and 2) what transaction attributes are needed to access the protection region.

9. The apparatus of claim 8, wherein the protection logic of the protection mechanism is configured so that when an error is detected, then the logic signals a security violation as an interrupt.

10. The apparatus of claim 1, wherein the protection mechanism further comprises:
one or more software configurable registers to create the two or more protection regions on the System on a Chip including the protection region, where the protection logic is configured to assign each protection region a priority level, and when protection regions overlap in address spacing, then a given protection region with a highest assigned priority level takes precedence in the overlapped address range, and wherein the protection logic has one or more registers to define protection region parameters that include the base starting address and the size of the protection region.

11. The apparatus of claim 1, further comprising:
an error logging logic that records details of a failed transaction, and that reports a failed transaction access attempt to either or both the first initiator intellectual property block that initiated the failed transaction or to another component.

12. A non-transitory computer readable storage media storing instructions, which when executed by a machine, the instructions are configured to cause the machine to generate a software representation of the apparatus of claim 1.

13. A non-transitory computer readable storage media containing instructions, which when executed by a machine, the instructions are configured to cause the machine to generate a software representation of an apparatus, where the apparatus includes:
an interconnect coupled and shared amongst a plurality of target intellectual property blocks including a first target intellectual property block, and a plurality of initiator intellectual property blocks including a first initiator intellectual property block, where the first target intellectual property block is configured to service and respond to transactions from the first initiator intellectual property block over the interconnect, wherein the interconnect has an associated protection mechanism with protection logic configured to restrict access for the transactions to the first target intellectual property block based on criteria including access permissions associated with a protection region for the first target intellectual property block, where the access permissions associated with the protection region at least include who is the source requesting access to the first target intellectual property block and the type of access being requested, where the interconnect is configured to route the transactions between the first initiator intellectual property block and the first target intellectual property block, where the protection logic is configurable to set the access permissions for two or more protection regions in the integrated circuit, where each protection region is associated with address spacing in the integrated circuit, where the protection mechanism compares to determine when attributes of the transaction satisfy the access permissions of a given protection region, where the protection mechanism is programmable to prevent unauthorized access to or from the protection region, and where at least the protection mechanism, the interconnect, the first initiator intellectual property block and the first target intellectual property block are located on and are part of a System on a Chip.

14. The apparatus of claim 13, where the protection mechanism is a firewall with protection logic located in 1) a target agent connected between the first target intellectual property block and the interconnect, 2) the interconnect, 3) and any combination of both.

15. The apparatus of claim 13, where the protection mechanism is a firewall with protection logic that includes a comparator to make a comparison between the transaction and the access permissions for the protection region to determine whether the transaction should be delivered to the first target intellectual property block based upon at least configured parameters in the access permissions.

16. The apparatus of claim 15, wherein the protection logic of the protection mechanism further includes software accessible registers to allow parameters that define each protection region and its access permissions to be programmable, and the protection logic is configured to create two or more protection regions including a default region at a lowest priority level that covers the address spacing for the entire target intellectual property block.

17. The apparatus of claim 13, wherein the protection logic of the protection mechanism is configured to allow a user to program both 1) a base starting address of the protection region and a size and 2) what transaction attributes are needed to access the protection region.

18. A method for a firewall protection mechanism for an interconnect located on a System on a Chip, comprising:
configuring the firewall protection mechanism having protection logic to restrict access for transactions intended for a first target intellectual property block on the System on a Chip based on criteria including access permissions associated with a protection region for the first target intellectual property block, where the interconnect is coupled between a first initiator intellectual property block and the first target intellectual property block, where the first target intellectual property block is configured to service and respond to transactions from the first initiator intellectual property block over the interconnect, wherein the firewall protection mechanism is associated with the interconnect and the protection logic is configurable to set the access permissions for two or more protection regions in the System on a Chip, where the access permissions associated with the protection region at least include which initiator is the source requesting access and the type of access being requested; and
configuring the interconnect to route the transactions between a plurality of target intellectual property blocks including the first target intellectual property block, and a plurality of initiator intellectual property blocks including the first initiator intellectual property block, where each protection region is associated with address spacing in the System on a Chip.

19. The method of claim 18, further comprising:
configuring the firewall protection mechanism to make a comparison between the transaction and the access permissions for the protection region to determine whether the transaction should be delivered to the first target intellectual property block based upon at least configured parameters in the access permissions.

20. The method of claim 18, further comprising:
configuring two or more protection regions to exist on the integrated circuit including the protection region, where the protection logic is configured to assign each protection region a priority level, and when protection regions overlap in address spacing, then the protection region with a highest assigned priority level takes precedence in the overlapped address range, and
configuring the protection logic of the firewall protection mechanism to create separate read request access permissions and write request access permissions for each group of initiator intellectual property blocks.

* * * * *